(12) United States Patent
Motomura et al.

(10) Patent No.: US 7,868,927 B2
(45) Date of Patent: Jan. 11, 2011

(54) IMAGE DATA GENERATING APPARATUS, METHOD AND PROGRAM

(75) Inventors: Hideto Motomura, Kyoto (JP); Takeo Azuma, Kyoto (JP); Kunio Nobori, Osaka (JP); Taro Imagawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/756,707

(22) Filed: Apr. 8, 2010

(65) Prior Publication Data

US 2010/0194911 A1 Aug. 5, 2010

Related U.S. Application Data

(63) Continuation of application No. 12/600,376, filed as application No. PCT/JP2008/001171 on May 9, 2008.

(30) Foreign Application Priority Data

Aug. 3, 2007 (JP) .............................. 2007-203539

(51) Int. Cl.
   *H04N 5/235* (2006.01)
   *H04N 5/225* (2006.01)
   *H04N 5/222* (2006.01)
(52) U.S. Cl. ................. 348/222.1; 348/218.1; 348/343; 348/333.11
(58) Field of Classification Search ............... 348/222.1, 348/218.1, 333.05, 335, 343, 344, 333.11
   See application file for complete search history.

(56) References Cited

U.S. PATENT DOCUMENTS 6,710,806 B1 * 3/2004 Satoh ......................... 348/350
(Continued)

FOREIGN PATENT DOCUMENTS

JP 07-203318 8/1995
(Continued)

OTHER PUBLICATIONS

International Search report for corresponding application No. PCT/JP2008/001171 dated Jul. 18, 2008.
(Continued)

*Primary Examiner*—Lin Ye
*Assistant Examiner*—Marly Camargo
(74) *Attorney, Agent, or Firm*—Renner, Otto, Boisselle & Sklar, LLP

(57) ABSTRACT

The shooting, recording and playback system 100 of the present invention receives incoming light 101, stores an image shot, and then subjects the image shot to be reproduced to resolution raising processing, thereby outputting RGB images with high spatial resolution and high temporal resolution ($R_{OUT}$ $G_{OUT}$ $B_{OUT}$) 102. The system 100 includes a shooting section 103, a color separating section 104, an R imaging sensor section 105, a G imaging sensor section 106, a B imaging sensor section 107, an image shot storage section 108, an image shot writing section 109, a memory section 110, an image shot reading section 111, a spatial resolution upconverter section 112, a temporal resolution upconverter section 113, an output section 114, and a line recognition signal generating section 185. The system can get image data with high spatial resolution and high temporal resolution without getting the camera configuration complicated and without decreasing the optical efficiency.

1 Claim, 30 Drawing Sheets

U.S. PATENT DOCUMENTS

| | | | |
|---|---|---|---|
| 7,319,216 B2 * | 1/2008 | Senba | 250/201.2 |
| 2005/0219642 A1 * | 10/2005 | Yachida et al. | 358/448 |
| 2007/0182844 A1 * | 8/2007 | Allman et al. | 348/345 |
| 2007/0189386 A1 * | 8/2007 | Imagawa et al. | 375/240.12 |
| 2010/0149381 A1 * | 6/2010 | Motomura et al. | 348/235 |

FOREIGN PATENT DOCUMENTS

| | | |
|---|---|---|
| JP | 2004-40422 | 2/2004 |
| JP | 2005-318548 | 11/2005 |
| JP | 3934151 | 3/2007 |

OTHER PUBLICATIONS

Co-pending U.S. Appl. No. 12/600,376 submitted on Nov. 16, 2009.
Co-pending U.S. Appl. No. 12/600,390 submitted Nov. 16, 2009.

* cited by examiner

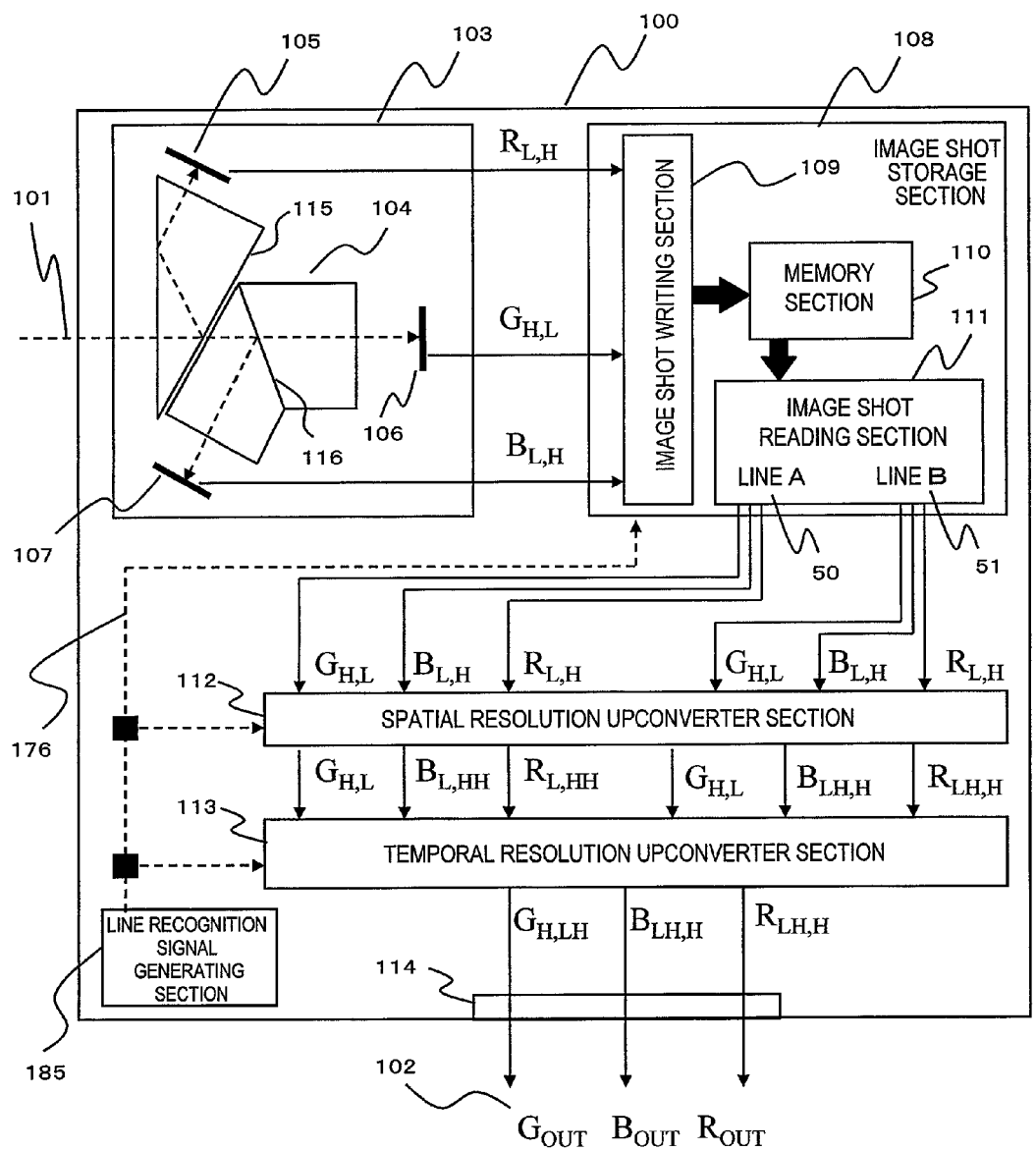

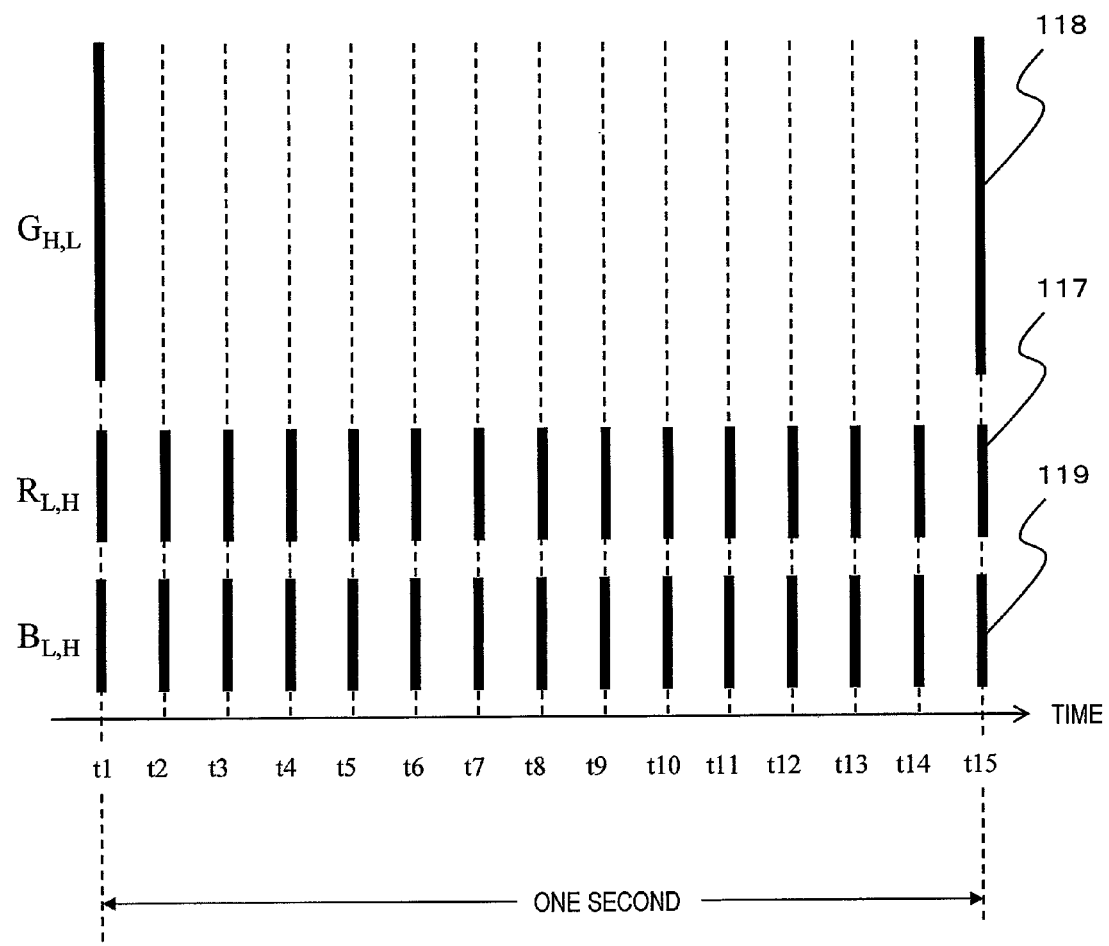

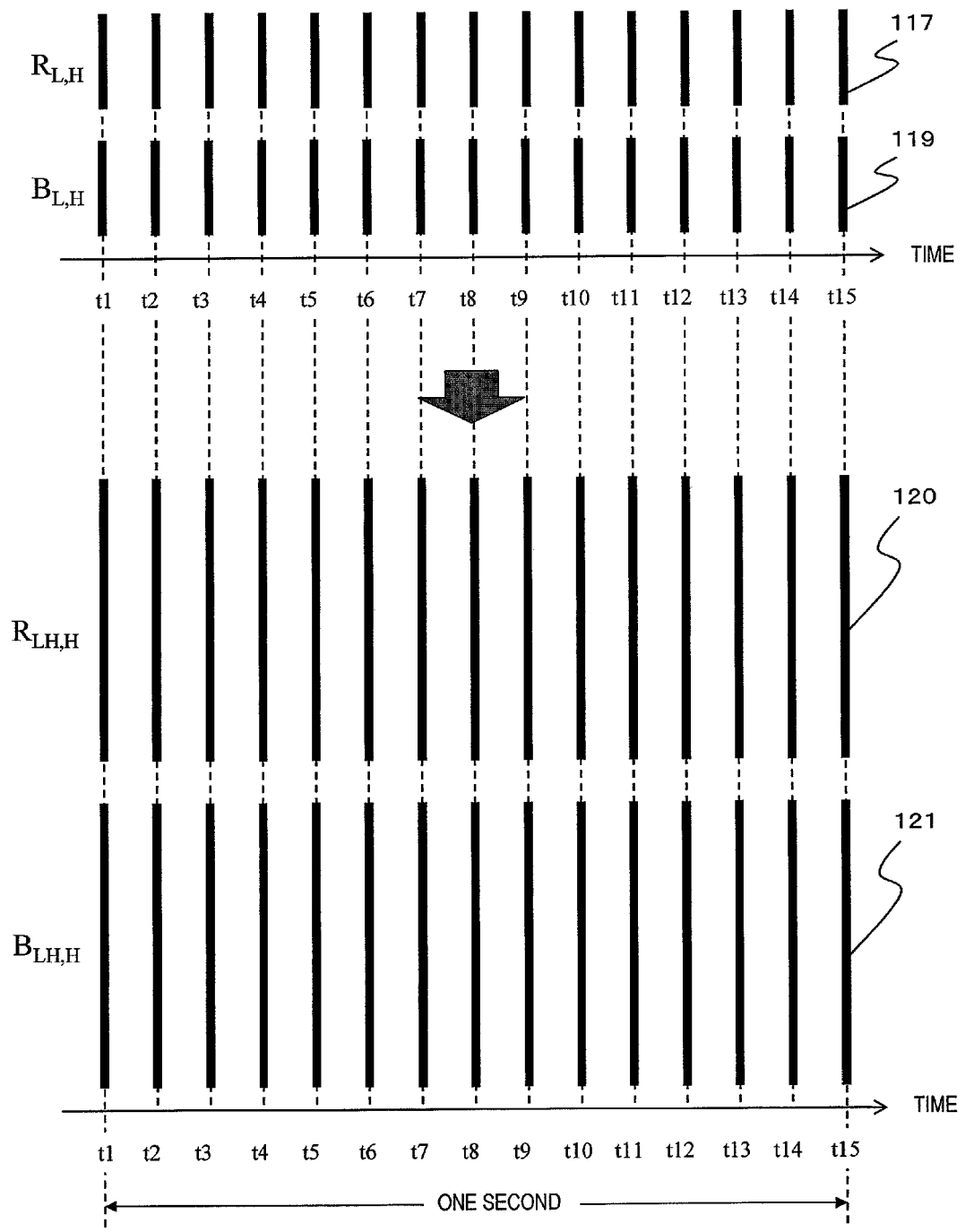

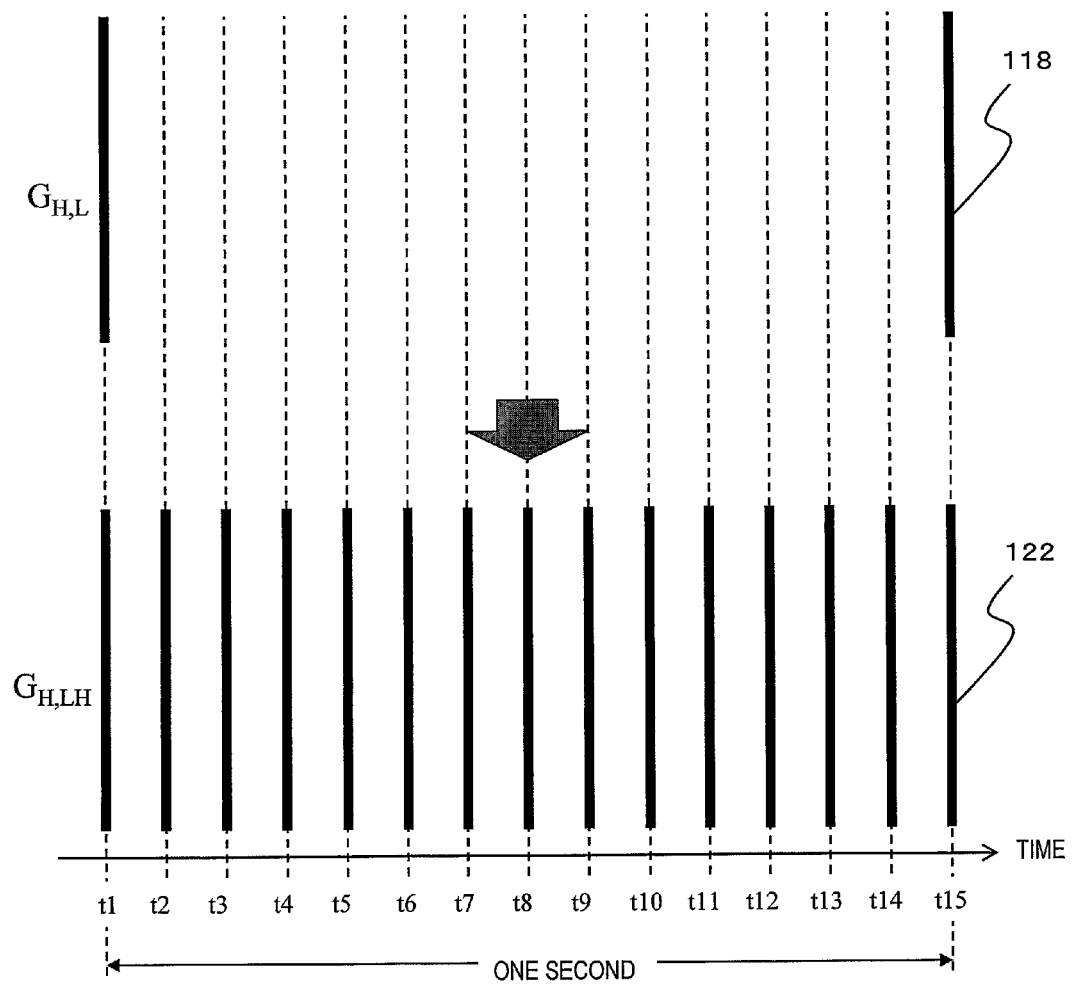

FIG.5
(a)
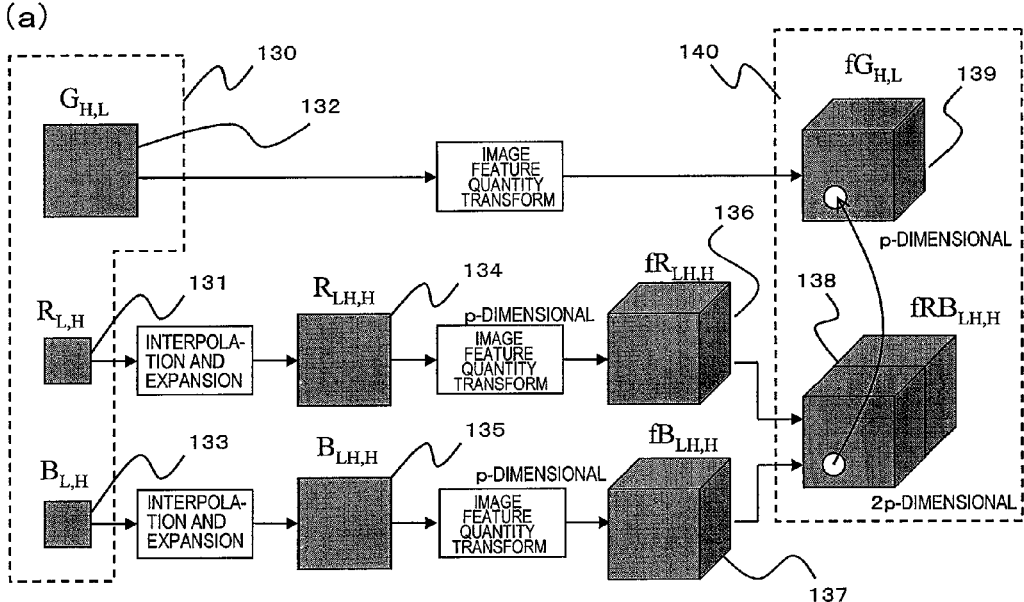
(b)
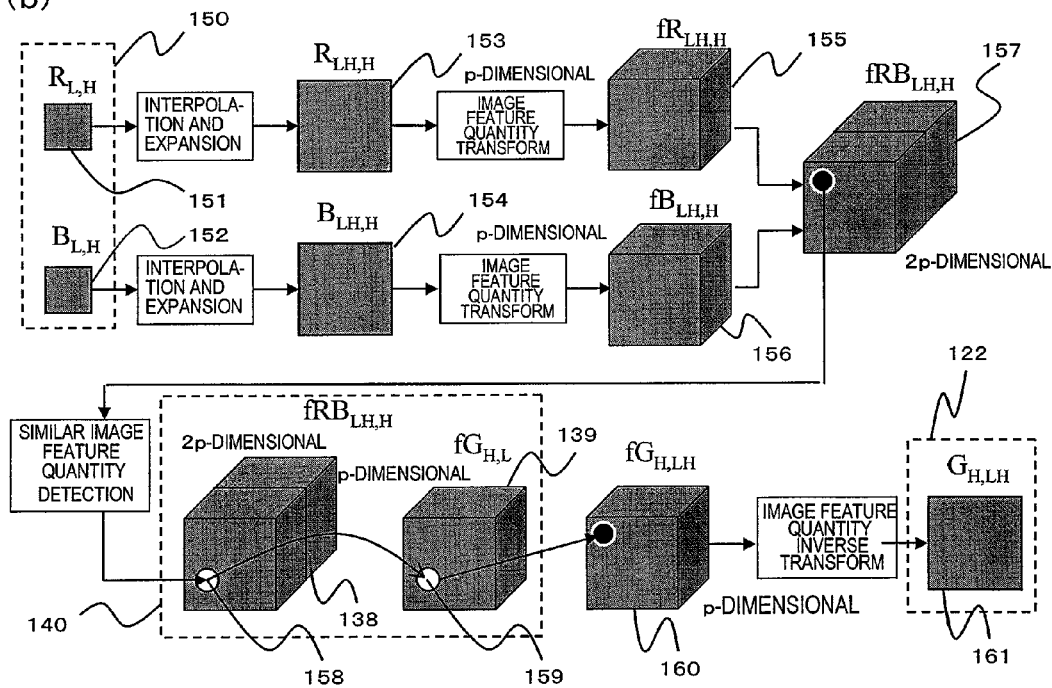

IMAGE FEATURE VECTOR $(w_1, w_2, ..., w_p)$ $P = 3n + 1$

FIG.7
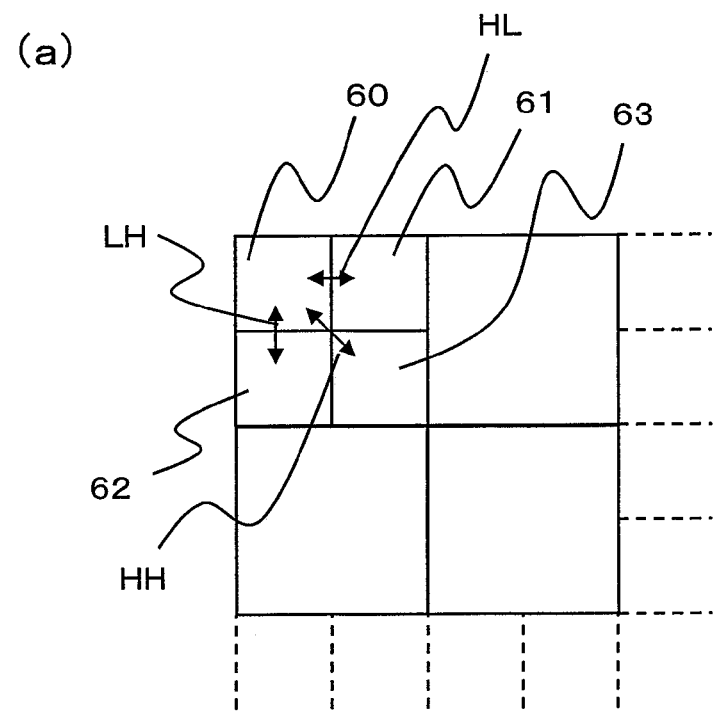
(a)
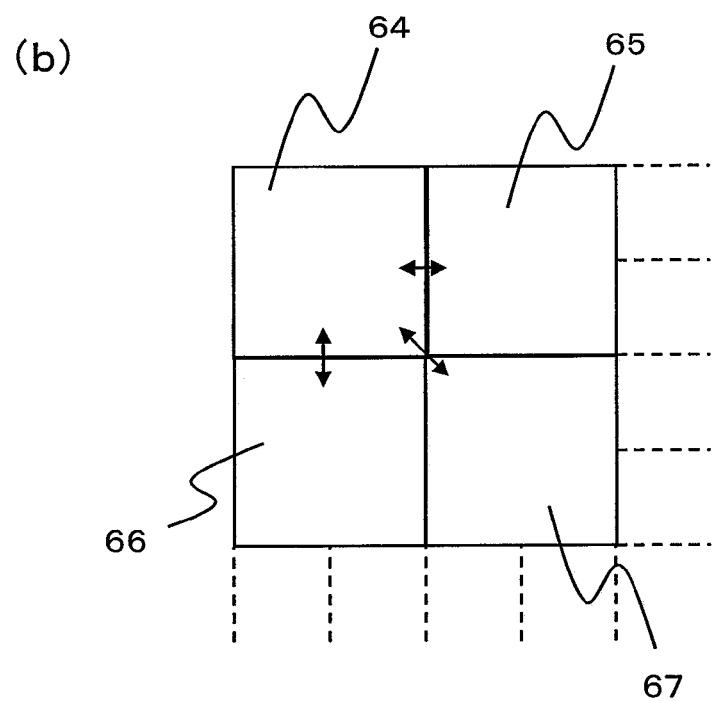
(b)

*FIG.17*
(a)
LUMINANCE IMAGE 304
Y
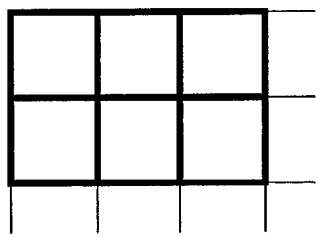
COLOR DIFFERENCE IMAGES 308
Pb
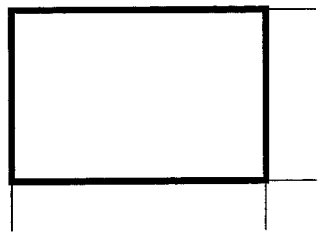
Pr
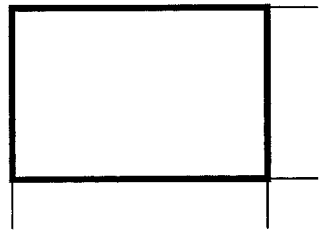
(b)
LUMINANCE IMAGE 304
Y
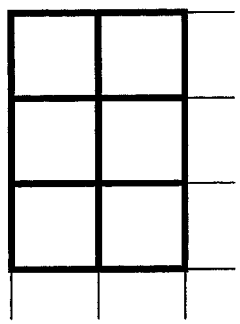
COLOR DIFFERENCE IMAGES 308
Pb
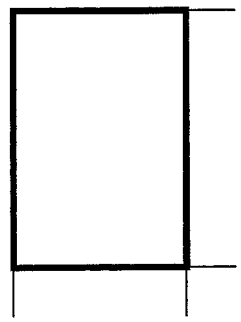
Pr
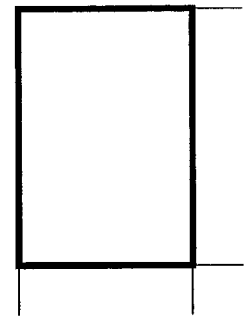

FIG.24
(a)
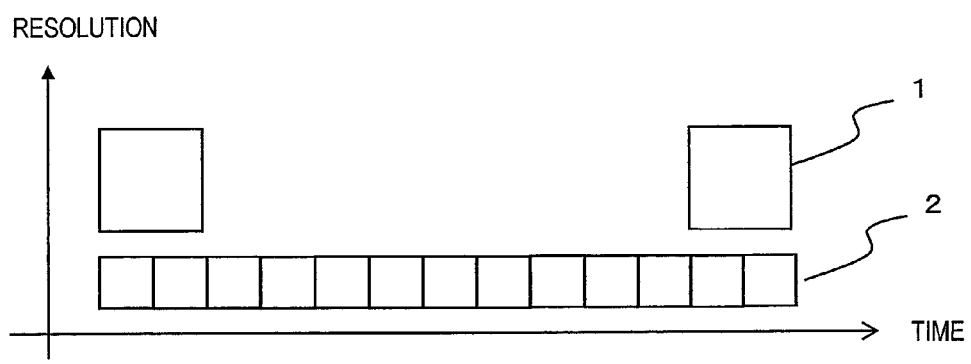
(b)
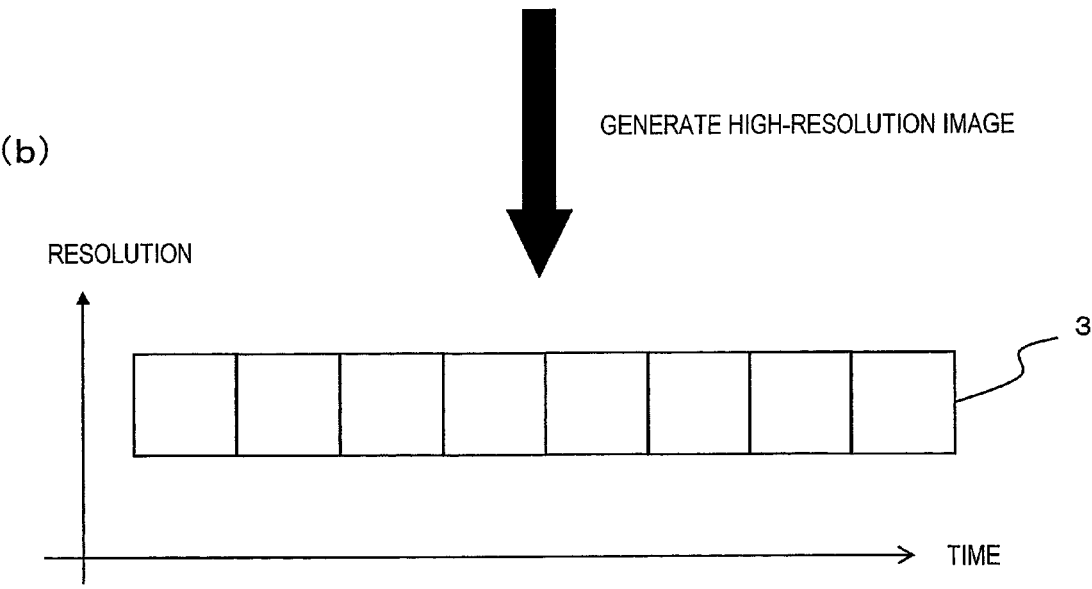

IMAGE DATA GENERATING APPARATUS, METHOD AND PROGRAM

This application is a continuation of U.S. patent application Ser. No. 12/600,376 submitted Nov. 16, 2009, which is a §371(c) of International Application No. PCT/JP2008/001171, filed May 9, 2008, and also claims priority to Japanese Application No. 2007-203539 filed on Aug. 3, 2007, the entire disclosures of which are incorporated herein by reference.

TECHNICAL FIELD

The present invention relates to an apparatus and method for capturing a high-resolution image at a high frame rate, an apparatus and method for capturing, recording and playing such an image at a high frame rate, and a program for capturing and recording such an image at such a rate.

BACKGROUND ART

Recently, a digital camcorder or digital still camera has come to have an imager, including photosensing elements at tremendously high densities, and have had their definitions increased by leaps and bounds. Generally speaking, the higher the resolution of an image captured, the more finely the user can record the scene before him or her. That is why there is an increasing demand for such high-resolution shooting.

The resolutions are classifiable into the spatial resolution and the temporal resolution. The resolution of the former type corresponds to the number of pixels that make up a single picture. If there are two imaging sensors of the same size but with different number of pixels, then an imaging sensor with the greater number of pixels will have a higher spatial resolution, and can record the details of the subject more finely, than the other imaging sensor. As a result, with such an imaging sensor, the user can shoot a still picture with higher presence and higher image quality. On the other hand, the resolution of the latter type corresponds to the number of pictures shot per unit time. An imaging sensor that can shoot a greater number of pictures per second will have a higher temporal resolution. Thus, with such an imaging sensor, the user can track even quick motions of the subject precisely, and can shoot a moving picture with smoother motion.

However, if the user wants to shoot the scene before him or her as finely as possible, he or she often opts for the highest possible spatial and temporal resolutions, thus making the data size of the picture huge. A DV camcorder, for example, will produce an image with a size of 720 pixels×480 lines. Supposing the frame rate is 30 frames per second, a 24 bit RGB color signal should have a data transfer rate of 249 Mbps (megabits per second) (=720 pixels×480 lines×24 bits×30). Meanwhile, a high definition camcorder will produce an image with a size of 1,920 pixels×1,080 lines. And the data transfer rate will be 1.5 Gbps (=1,920 pixels×1,080 lines×24 bits×30), which is six times as high as that of the DV camcorder. If the temporal resolution was doubled and the frame rate was increased to 60 frames per second, then the data transfer rate would be 3 Gbps. In such a situation, the data transfer rate should always be that high since the data has been output from the imaging sensor of the camera and until it is written on a storage medium or until the display monitor is scanned. However, with that high data transfer rate, the load on a normal consumer camcorder or digital camera would be too heavy to handle. That is why by utilizing its redundancy, the data is usually compressed to keep the device as small as possible, cut down the power dissipation, and minimize the cost. Even in camcorders or digital cameras for business use, the data size is also often cut down by compression. And only expensive editing systems for professional use will operate at the original data transfer rate.

As can be seen, to transmit and receive such a high-definition image, of which the spatial and temporal resolutions are both high, at as low a data transfer rate as possible, it is important to acquire only essential data and cut down the redundancy. For that purpose, a technique for acquiring only essential data when an image is captured would work fine. For example, Patent Document No. 1 discloses a technique for acquiring image data 1 with high spatial resolution but low temporal resolution and image data 2 with low spatial resolution but high temporal resolution as shown in FIG. 24(a) and then generating image data 3 with high spatial resolution and high temporal resolution by performing image processing on them as shown in FIG. 24(b).

Supposing the shooting time is one second, the image data 1 has an image size of 1,920 pixels×1,080 lines, and the image data 2 has an image size of 640 pixels×360 lines in the example illustrated in FIG. 24, the 8-bit luminance signal shown in FIG. 24(a) comes to have a data transfer rate of 54 Mbps (=1,920 pixels×1,080 lines×8 bits×2+640 pixels×320 lines×8 bits×13). In FIG. 24(b), on the other hand, as there are eight pictures each consisting of 1,920 pixels×1,080 lines, the 8-bit luminance signal comes to have a data transfer rate of 133 Mbps (=1,920 pixels×1,080 lines×8 bits×8). Consequently, the data transfer rate in FIG. 24(b) is approximately 2.4 times as high as the one in FIG. 24(a).

FIG. 25 is a flowchart showing the procedure for generating the image data 3. As shown in FIG. 25, a motion vector is estimated with the low-spatial-resolution image represented by the image data 2 (in Steps S101 to S103). Based on a result of the motion estimation, the high-spatial-resolution image of the image data 1 is subjected to motion compensation (in Step S104). Next, the DCT (discrete cosine transform) spectrum of the motion-compensated high-spatial-resolution image is synthesized with that of its associated low-spatial-resolution image, and then an inverse DCT is carried out on the synthesized spectrum, thereby obtaining a target high-spatial-resolution, high-temporal-resolution image (in Steps S105 and S106).

FIG. 26 illustrates an exemplary configuration for a composite sensor camera for acquiring the image data 1 and 2. The composite sensor camera 4 is a camera for capturing two types of image data with the same field of view and includes a light splitting element 5 such as a prism or a half mirror, two lenses 6, a high-spatial-resolution, low-temporal-resolution camera 7 and a low-spatial-resolution, high-temporal-resolution camera 8. The light splitting element 5 partially reflects incoming light 9. The two lenses 6 condense the light that has been reflected by the light splitting element 5 and the light that has been transmitted by the light splitting element 5, respectively. The high-spatial-resolution, low-temporal-resolution camera 7 produces a high-spatial-resolution, low-temporal-resolution image based on the light that has been condensed by the one lens 6, thereby outputting the image data 1. On the other hand, the low-spatial-resolution, high-temporal-resolution camera 8 produces a low-spatial-resolution, high-temporal-resolution image based on the light that has been condensed by the other lens 6, thereby outputting the image data 2.

Patent Document No. 1: Japanese Patent Application Laid-Open Publication No. 2005-318548 (FIGS. 2, 3 and 5)

DISCLOSURE OF INVENTION

Problems to be Solved by the Invention

However, the conventional image capturing technology described above has the following drawbacks in terms of the sensitivity of the imaging sensor and RGB color shooting.

Specifically, in the composite sensor camera 4, the light splitting element 5 distributes the incoming light 9 to the high-spatial-resolution, low-temporal-resolution camera 7 and the low-spatial-resolution, high-temporal-resolution camera 8, and therefore, the intensity of the light entering each of these cameras decreases to a half, which would decrease the signal to noise ratio (SNR) of the image captured and eventually debase the image quality more often than not. Nevertheless, if the exposure were performed for a longer time to check the decrease in SNR, then the image would possibly be blurred, thus resulting in deteriorated image quality in many cases.

Also, to capture an RGB color image using the composite sensor cameras 4, three composite sensor cameras 4 should be provided (which will be identified herein by the reference numerals 41, 42 and 43, respectively) as shown in FIG. 27. And to distribute the incoming light 9 to those three composite sensor cameras 41, 42 and 43, two color separation filters 10 and 11 should be used. In this case, the color separation filter 10 would reflect long wavelength components (falling within the range of approximately 600-780 nm) but transmit the other wavelength components. The reflected light 12 would be incident on the composite sensor camera 41, where those long wavelength components would be captured to produce an R image (which is an image representing red components of the light). Meanwhile, the light 13 transmitted through the color separation filter 10 would be incident on the color separation filter 11, which would reflect the short wavelength components (falling within the range of approximately 380-500 nm) but transmit the other wavelength components. Then, the reflected light 14 would be incident on the composite sensor camera 42, where those short wavelength components would be captured to produce a B image (which is an image representing blue components of the light). And the light 15 to be transmitted through the color separation filter 11 would be the rest of the incoming light 9 other than its components 12 and 14 that have been reflected by the color separation filters 10 and 11, respectively, and would be the remaining middle wavelength components (falling within the range of approximately 500-600 nm). The transmitted light 15 would be incident on the composite sensor camera 43, where those middle wavelength components would be captured to produce a G image (which is an image representing green components of the light). Thus, the addition of the color separation filters 10 and 11 to the composite sensor cameras would increase the sizes of the cameras and decrease the handiness and portability thereof.

On the other hand, to prevent the camera from increasing its overall size, a color filter layer 16 such as the one shown in FIG. 29 could be arranged as shown in FIG. 28 before each of the high-spatial-resolution, low-temporal-resolution camera 7 and low-spatial-resolution, high-temporal-resolution camera 8, thereby separating the incoming light into the RGB images. Specifically, in the color filter layer 16, the color filters located at pixels 20 would transmit only G components with middle wavelengths and absorb R and B components with long and short wavelengths, thereby producing a G image. In the same way, the color filters located at pixels 21 would transmit only R components with long wavelengths and absorb G and B components with middle and short wavelengths, thereby producing an R image. And the color filters located at pixels 22 would transmit only B components with short wavelengths and absorb R and G components with long and middle wavelengths, thereby producing a B image. In this manner, the color filter layer 16 would get the color separation done with components of the incoming light with unnecessary wavelengths absorbed. As a result, the optical efficiency would be eventually lower than a monochrome camera. That is to say, as the incoming light should be separated into the three colors of R, G and B, approximately a third of the incoming light would be incident on the camera and the other two-thirds would be absorbed into the color filter layer 16, theoretically speaking.

It is therefore an object of the present invention to provide apparatus, method, program and shooting, recording and playback system that can acquire image data with high spatial resolution and high temporal resolution without increasing the complexity of the configuration of a camera used and without decreasing its optical efficiency with respect to the incoming light.

Means for Solving the Problems

An apparatus according to the present invention generates image data and is characterized by including: a light splitting section for splitting incoming light that has come from a subject into a number of wavelength ranges; a first image capturing section, which receives a portion of the split light that falls within a wavelength range with the highest luminosity factor, thereby getting a first image; a second image capturing section, which receives the rest of the light that falls within the remaining wavelength ranges, other than the one with the highest luminosity factor, thereby getting a second image that has a lower spatial resolution, and a higher temporal resolution, than the first image; and a resolution converting section for converting the temporal resolution of the first image into that of the second image using the first and second images.

In one preferred embodiment, the resolution converting section converts the second image, which has been captured at the same time as the first image, so that the second image has the same spatial resolution as the first image. Also the resolution converting section associates a first predetermined pixel in the first image with a second pixel, which is present, in the second image converted, at the same pixel location as the first pixel, and retains their correspondence. Furthermore, the resolution converting section converts the second image, which has been captured at a different time from the first image, so that the second image has the same spatial resolution as the first image. In that case, the resolution converting section determines a third pixel, which has a higher degree of similarity to a second pixel portion of the second image converted that has been captured at the different time from the first image than any other pixel, and allocates an image portion of the first pixel to a fourth pixel, which is present, in the first image, at the same pixel location as the third pixel, thereby generating an image for a timing at which the first image has not been captured.

In another preferred embodiment, the light splitting section splits the incoming light that has come from the subject into red, green and blue light beams. The first image capturing section receives the green light beam as the light that falls within the wavelength range with the highest luminosity factor, thereby getting a first image representing green components. The second image capturing section includes: a red light image capturing section that receives the red light beam as the light that falls within the remaining wavelength ranges, other than the one with the highest luminosity factor, thereby getting a second image representing red components; and a blue light image capturing section that receives the blue light beam as the light that falls within the remaining wavelength ranges, other than the one with the highest luminosity factor, thereby getting a second image representing blue components.

In this particular preferred embodiment, the second image representing the red components and the second image representing the blue components have the same spatial resolution and the same temporal resolution.

In still another preferred embodiment, the apparatus further includes a storage section that stores the first and second images. The resolution converting section uses the first and second images that have been retrieved from the storage section to convert the temporal resolution of the first image into that of the second image.

In yet another preferred embodiment, the resolution converting section converts the spatial resolution of the second image into that of the first image. The resolution converting section includes a database section that stores the first image and the second image converted. The resolution converting section uses the first image and the second image converted that have been retrieved from the database section to convert the temporal resolution of the first image into that of the second image.

In this particular preferred embodiment, the apparatus further includes an image blur detecting section for detecting an image blur. If the image blur detecting section has detected an image blur, the database section stops storing the first image and the second image converted.

In yet another preferred embodiment, the apparatus further includes: a luminance generating section for generating a luminance image based on an output image supplied from the resolution converting section; and a color difference generating section, which lowers the resolution of a portion of the output image representing green components, thereby producing a color difference image based on the image representing the green components, of which the resolution has been lowered, an image representing red components, and an image representing blue components.

A method according to the present invention is a method for generating image data. The method includes the steps of: splitting incoming light that has come from a subject into a number of wavelength ranges; receiving a portion of the split light that falls within a wavelength range with the highest luminosity factor, thereby getting a first image; receiving the rest of the light that falls within the remaining wavelength ranges, other than the one with the highest luminosity factor, thereby getting a second image that has a lower spatial resolution, and a higher temporal resolution, than the first image; and converting the temporal resolution of the first image into that of the second image using the first and second images.

A program according to the present invention is defined so as to get image data generation processing executed by a computer. The image data generation processing includes the steps of: receiving a first image that has been generated by receiving a portion of incoming light that falls within a wavelength range with the highest luminosity factor and that has been obtained by splitting the incoming light that has come from a subject into a number of wavelength ranges; receiving a second image that has a lower spatial resolution, and a higher temporal resolution, than the first image and that has been generated by receiving the rest of the light that falls within the remaining wavelength ranges, other than the one with the highest luminosity factor; and converting the temporal resolution of the first image into that of the second image using the first and second images.

Another apparatus according to the present invention performs image data generation processing and includes a resolution converting section for converting the temporal resolution of an image. The resolution converting section receives not only a first image that has been generated by receiving a portion of incoming light that falls within a wavelength range with the highest luminosity factor and that has been obtained by splitting the incoming light that has come from a subject into a number of wavelength ranges, but also a second image that has a lower spatial resolution, and a higher temporal resolution, than the first image and that has been generated by receiving the rest of the light that falls within the remaining wavelength ranges, other than the one with the highest luminosity factor. And the apparatus converts the temporal resolution of the first image into that of the second image using the first and second images.

To overcome the problems with the prior art described above, according to the present invention, a first image with a high spatial resolution and a low temporal resolution is obtained in a wavelength range (G) with the highest luminosity factor, a second image with a low spatial resolution and a high temporal resolution is obtained in the remaining wavelength ranges (R, B), and the temporal resolution of the first image is converted into that of the second image based on the correspondence between the low-spatial-resolution image and the high-spatial-resolution image. To separate the incoming light into three wavelength ranges, two color separation filters are used. Specifically, one of the two color separation filters may reflect light falling within one of the three wavelength ranges that has the longest wavelength (i.e., R wavelength range) and transmit light falling within the other G and B wavelength ranges. The light that has been transmitted and that falls within the G and B ranges is incident on the other color separation filter, which may reflect B components with shorter wavelengths and transmit G components with middle wavelengths.

The light falling within the wavelength range with the highest luminosity factor (i.e., the G wavelength range) is incident on a high-spatial-resolution, low-temporal-resolution imaging sensor to produce the first image described above. On the other hand, the light beams falling within the R and B wavelength ranges are incident on their respective low-spatial-resolution, high-temporal-resolution imaging sensor, thus producing two images as second images. Information about how to increase the spatial resolution is obtained based on the correspondence between the first image (i.e., G image with high spatial resolution) and the second images (i.e., R and B images with low spatial resolutions). Based on that information, the second images are subjected to spatial resolution increasing processing at a point in time when the first image is not captured, thereby generating the first image and obtaining a G image with high spatial resolution and high temporal resolution. The low-spatial-resolution R and B images with lower luminosity factors can have their spatial resolution increased to that of the G image either by copying a pixel value to adjacent pixels or by performing interpolation and expansion. To avoid losing a grey balance, the R, G and B images that have had their resolution increased may be synthesized together in a YPbPr space by being converted into a luminance color difference signal YPbPr and then inversely converted into an RGB signal, thereby obtaining an RGB color image with high spatial resolution and high temporal resolution.

According to such a scheme, the RGB color separation and spatial and temporal resolution assignment can get done at the same time. As a result, a high-spatial-resolution, high-temporal-resolution RGB color image can be obtained using a three-panel color camera without decreasing the optical efficiency.

EFFECTS OF THE INVENTION

An apparatus according to the present invention separates incoming light that has come from a subject into a number of wavelength ranges, receives a portion of the split light that falls within a wavelength range with the highest luminosity factor, thereby getting a first image, receives the rest of the light that falls within the remaining wavelength ranges, other than the one with the highest luminosity factor, thereby getting a second image that has a lower spatial resolution, and a higher temporal resolution, than the first image, and converts the temporal resolution of the first image into that of the second image using the first and second images. By separating the light that has come from a subject and receiving those split light beams in this manner, the decrease in optical efficiency can be avoided. In addition, by increasing the temporal resolution of the first image using the second image, image data with high spatial resolution and high temporal resolution can be obtained.

According to the present invention, high-spatial-resolution, high-temporal-resolution image data of a huge size can be acquired at more than the data transfer rate of imaging sensors while using a three-panel color camera. As a result, a quality image with a higher resolution can be obtained without sacrificing the portability or price competitiveness.

BRIEF DESCRIPTION OF DRAWINGS

FIG. 1 is a block diagram illustrating a configuration for a shooting, recording and playback system 100 as a first specific preferred embodiment of the present invention.

FIG. 2A schematically illustrates the relations between the R, G and B imaging sensor sections 105, 106 and 107 in terms of spatial and temporal resolutions.

FIG. 2B schematically illustrates conceptually how the spatial resolution upconverter section 112 raises the spatial resolution of R and B images 117 and 119.

FIG. 2C schematically illustrates conceptually how the temporal resolution upconverter section 113 raises the temporal resolution of a G image 118.

FIGS. 5(*a*) and 5(*b*) illustrate a principle on which the spatial resolution upconverter section 112 and the temporal resolution upconverter section 113 generate a G image 122.

FIGS. 7(*a*) and 7(*b*) illustrate how to perform a Wavelet transform.

FIGS. 17(*a*) and 17(*b*) illustrate how the image sizes of a luminance image 304 and color difference images 308 may be different.

Portions (a) and (b) of FIG. 24 illustrate conceptually how to get high-spatial-resolution, low-temporal-resolution image data 1 and low-spatial-resolution, high-temporal-resolution image data 2 and generate high-spatial-resolution, high-temporal-resolution image data 3.

Figure 25:
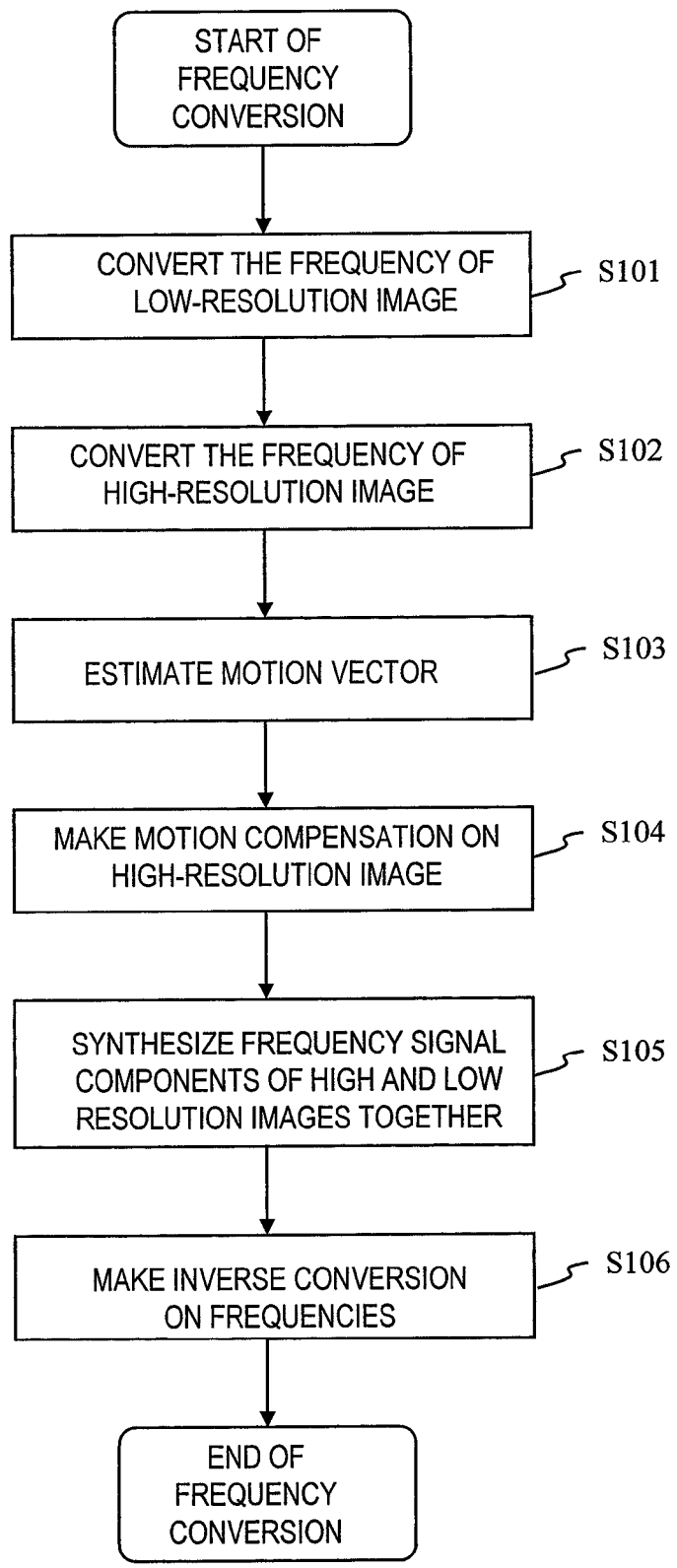

FIG. 25 is a flowchart showing the procedure of generating the image data 3.

Figure 26:
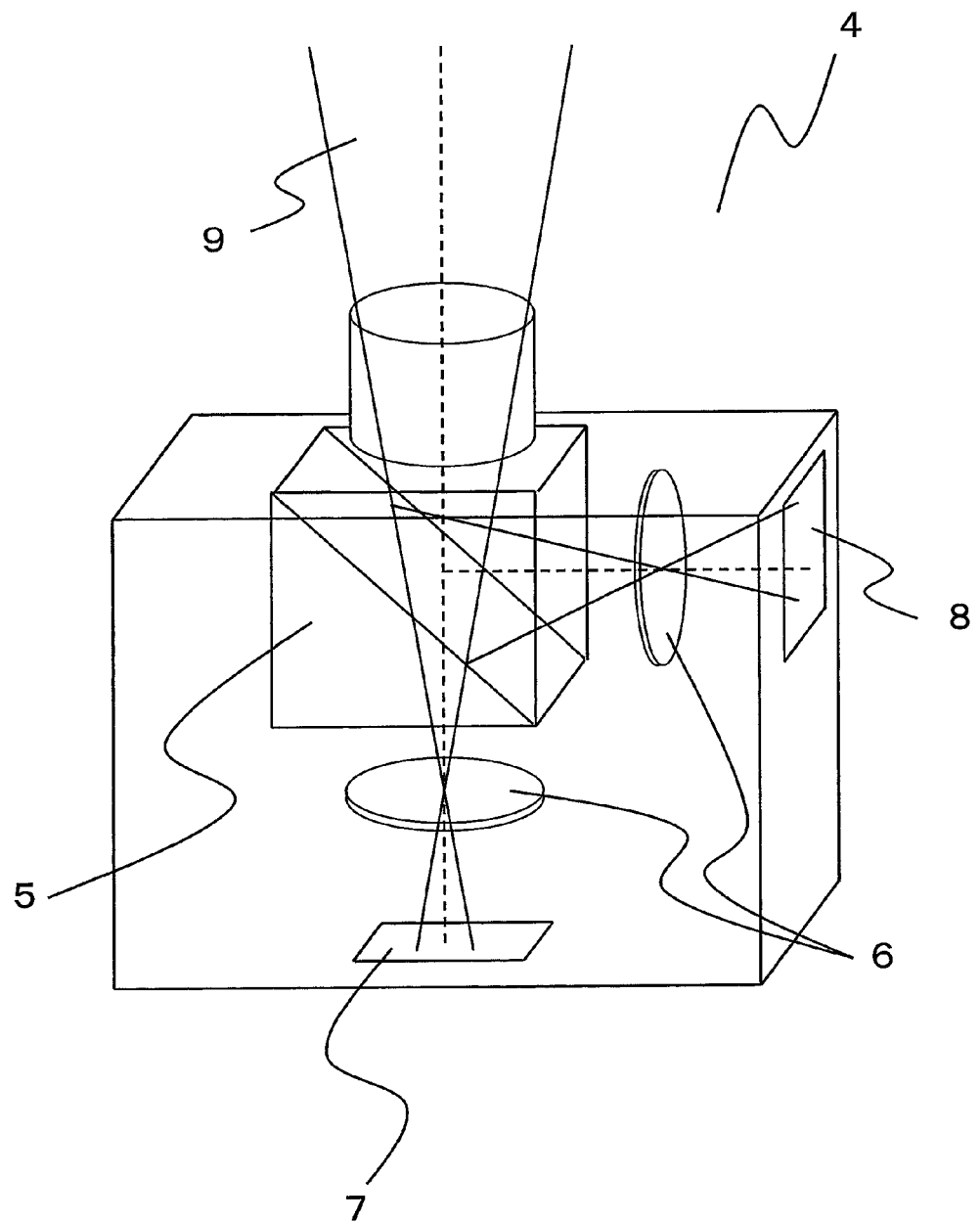

FIG. 26 illustrates an exemplary configuration for a composite sensor camera to acquire the image data 1 and 2.

Figure 27:
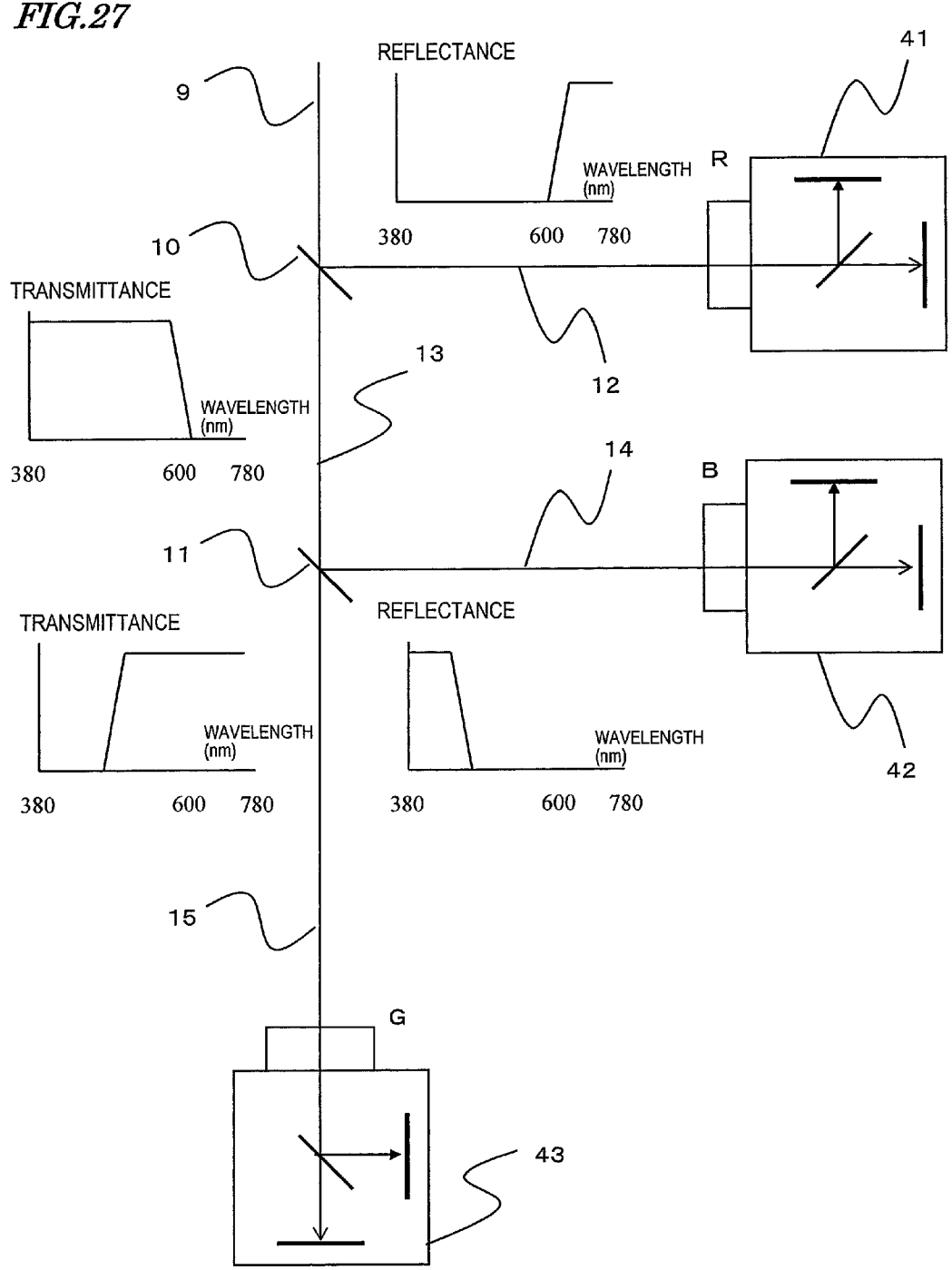

FIG. 27 illustrates how to get RGB color shooting done.

Figure 28:
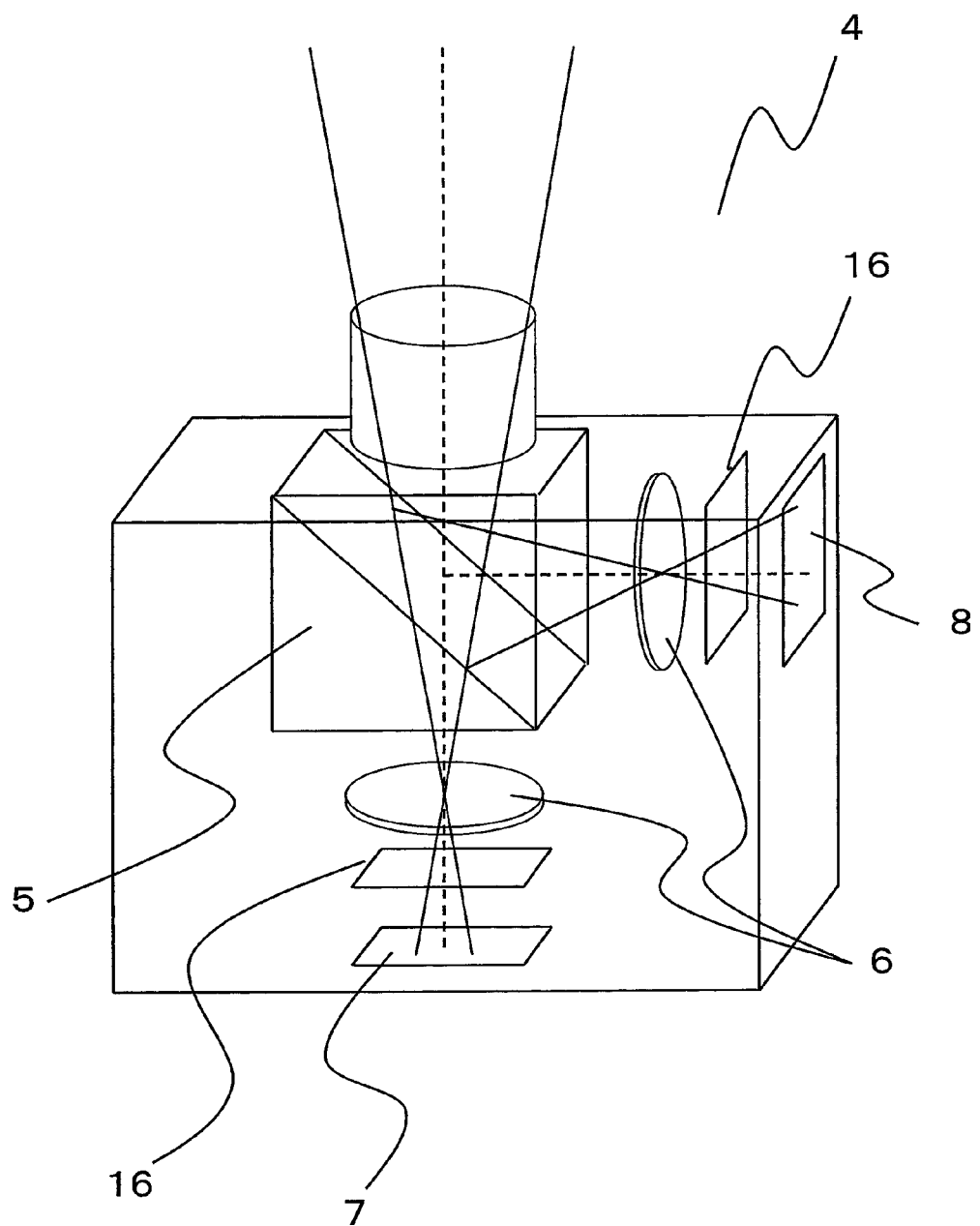

FIG. 28 illustrates an exemplary configuration for a composite sensor camera to get the RGB color shooting done.

Figure 29:
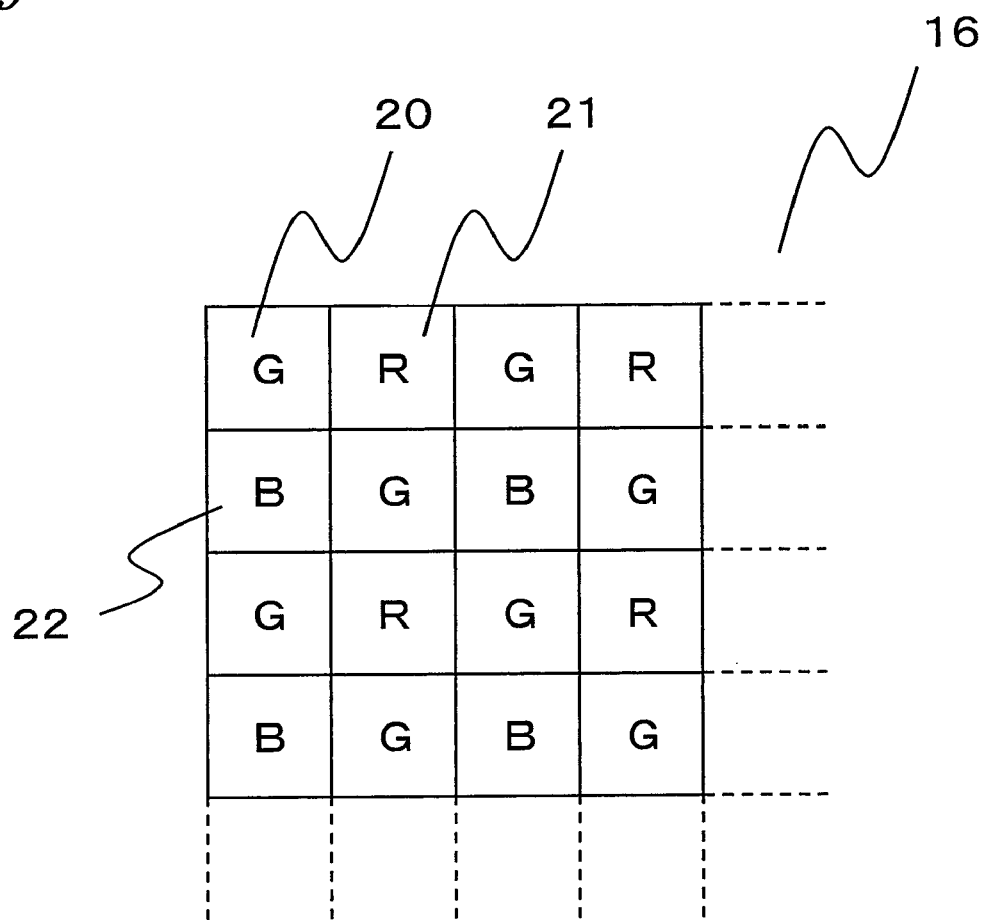

FIG. 29 illustrates the details of the color filter layer 16.

DESCRIPTION OF REFERENCE NUMERALS

100, 200, 300, 400, 500, and 600 shooting, recording and playback system
101 incoming light
102 RGB images ($R_{OUT}$, $G_{OUT}$, $B_{OUT}$) with high spatial resolution and high temporal resolution
103 shooting section
104 color separating section
105 R imaging sensor section
106 G imaging sensor section
107 B imaging sensor section
108 image shot storage section
109 image shot writing section
110 memory section
111 image shot reading section
112 spatial resolution upconverter section
113 temporal resolution upconverter section
114 output section 185 line recognition signal generating section

BEST MODE FOR CARRYING OUT THE INVENTION

Hereinafter, preferred embodiments of the present invention will be described in detail with reference to the accompanying drawings. The colors red, green and blue are identified by the signs R, G and B, respectively. For example, an "R image", a "G image" and a "B image" mean an image representing the red components of light, an image representing the green components of light, and an image representing the blue components of light, respectively.

Embodiment 1

FIG. 1 is a block diagram illustrating a shooting, recording and playback system 100 as a first specific preferred embodiment of the present invention.

The shooting, recording and playback system 100 receives incoming light 101, stores an image shot, and then subjects the image shot to be reproduced to resolution raising processing, thereby outputting RGB images with high spatial resolution and high temporal resolution ($R_{OUT} G_{OUT} B_{OUT}$) 102. The shooting, recording and playback system 100 captures and stores a first image with high spatial resolution and low temporal resolution in a wavelength range with the highest luminosity factor (i.e., the green (G) wavelength range) and a second image with low spatial resolution and high temporal resolution in the other wavelength ranges (i.e., the red (R) and blue (B) wavelength ranges), respectively. Then, the system 100 converts the temporal resolution of the first image into that of the second image in accordance with the correspondence between the image with low spatial resolution and the image with high spatial resolution and then reproduces those images.

The shooting, recording and playback system 100 includes a shooting section 103, a color separating section 104, an R imaging sensor section 105, a G imaging sensor section 106, a B imaging sensor section 107, an image shot storage section 108, an image shot writing section 109, a memory section 110, an image shot reading section 111, a spatial resolution upconverter section 112, a temporal resolution upconverter section 113, an output section 114, and a line recognition signal generating section 185.

The shooting section 103 receives the incoming light 101 and outputs an RGB color image. The color separating section 104 functions as a light splitting section for splitting the incoming light 101 into a long wavelength range R, a middle wavelength range G and a short wavelength range B and gets color separation done such that the R, G and B imaging sensor sections 105, 106 and 107 can capture R, G and B images, respectively. The plane 115 corresponds to the color separation filter 10 shown in FIG. 27 and reflects a part of the light falling within the long wavelength range R but transmits the rest of the light falling within the other wavelength ranges. The plane 116 corresponds to the color separation filter 11 shown in FIG. 27 and reflects a part of the light falling within the short wavelength range B but transmits the rest of the light falling within the other wavelength ranges.

The G imaging sensor section 106 is an imaging sensor with high spatial resolution that has a greater number of imagers than the R or B imaging sensor section 105 or 107. In this preferred embodiment, the G imaging sensor section 106 is supposed to have a high definition resolution consisting of 1,920 pixels by 1,090 lines. Meanwhile, the number of pixels and the number of lines of the R and B imaging sensor sections 105 and 107 are one third as large as those of the G imaging sensor section 106, i.e., 640 pixels by 360 lines. On the other hand, the relation between the temporal resolution of the G imaging sensor section 106 and that of the other imaging sensor sections is quite opposite to the one between their spatial resolutions. Specifically, the G imaging sensor section 106 has a temporal resolution of 2 fps (frames per second), while the R and B imaging sensor sections 105 and 107 have a temporal resolution of 15 fps. Thus, the G imaging sensor section 106 has a low temporal resolution, and the R and B imaging sensor sections 105 and 107 have a high temporal resolution. FIG. 2A schematically illustrates the relations between the R, G and B imaging sensor sections 105, 106 and 107 in terms of spatial and temporal resolutions. Specifically, the G image 118 shot by the G imaging sensor section 106 includes only two pictures that were taken at times t1 and t15. On the other hand, the R image 117 shot by the R imaging sensor section 105 and the B image 119 shot by the B imaging sensor section 107 include 15 pictures that were taken from the time t1 through the time 15.

In this description, the degrees of the spatial and temporal resolutions of each of the R, G and B images will be denoted herein by $X_{S,T}$, where X is R, G or B, S denotes a spatial resolution that is either high (H) or low (L), and T denotes a temporal resolution that is either high (H) or low (L). That is to say, X denotes the type of the image (that is one of R, G and B), S indicates the degree of spatial resolution, and T indicates the degree of temporal resolution. The degrees of resolutions are determined to be relatively high or relatively low. In this example, the respective degrees of resolutions are defined as follows:

High spatial resolution: 1,920 pixels by 1,080 lines
Low spatial resolution: 640 pixels by 360 lines
High temporal resolution: 15 fps and
Low temporal resolution: 2 fps As shown in FIG. 2A, the G image that is the output of the G imaging sensor section 106 has high spatial resolution and low temporal resolution, and therefore is identified herein by $G_{H,L}$. On the other hand, the R image that is the output of the R imaging sensor section 105 and the B image that is the output of the B imaging sensor section 107 have low spatial resolution and high temporal resolution, and therefore, are identified herein by $R_{L,H}$ and $B_{L,H}$, respectively.

The image shot storage section 108 reads and writes the R, G and B images that have been supplied from the shooting section 102.

The image shot writing section 109 writes the R, G and B images on the memory section 110, thereby recording the image shots there. The image shot reading section 111 reads the R, G and B images from the memory section 110 through two lines (which will be referred to herein as "Line A 50" and "Line B 51", respectively). Line A 50 reads the R, G and B images from the memory section 110 so that the temporal resolution upconverter section 113 can learn the relation between a low-spatial-resolution image and a high-spatial-resolution image as will be described later. On the other hand, Line B 51 reads the R, G and B images from the memory section 110 to play back the image shots and output an RGB image with high spatial resolution and high temporal resolution ($R_{OUT} G_{OUT} B_{OUT}$) 102. If the image shot writing section 109 writes the 24-bit R, G and B images with the spatial and temporal resolutions shown in FIG. 2A onto the memory section 110, then the data transfer rate will be 88 Mbps (=(1,920 pixels×1,080 lines×8 bits×2)+(640 pixels×360 lines×8 bits×15)*2 channels). The image shot reading section 111 also operates at the same data transfer rate. As the memory section 110, any type of storage medium such as a hard disk that uses a magnetic material or a semiconductor memory may be used. If the storage medium is removable from the shooting, recording and playback system 100, then the image shots that have been taken with this shooting, recording and playback system 100 can be moved or copied to another device.

As shown in FIG. 2B, the spatial resolution upconverter section 112 increases the spatial resolutions of the R and B images 117 and 119 and changes the number of pixels and the number of lines of the R and B images into 1,920 pixels×1,080 lines, which are the same as those of the G image 118, thereby outputting an R image 120 and a B image 121. To indicate that the spatial resolution has been increased, another subscript is added to the S and T subscripts. Specifically, the R image 120 that has had its spatial resolution increased is identified herein by $R_{LH,H}$, while the B image 121 that has had its spatial resolution increased is identified herein by $B_{LH,H}$.

On the other hand, the temporal resolution upconverter section 113 increases the temporal resolution of the G image 118, thereby outputting a G image 122 at a frame rate of 15 ftp, which is as high as that of the R and B images 117 and 119, as shown in FIG. 2C. The G image 122 that has had its temporal resolution increased is identified herein by $G_{H,LH}$.

The spatial and temporal resolution upconverter sections 112 and 113 will be collectively referred to herein as a "resolution converting section".

The respective components of the shooting, recording and playback system 100, such as the image shot storage section 108, the spatial resolution upconverter section 112, and the temporal resolution upconverter section 113, could be implemented as circuit components that make a semiconductor integrated circuit, for example. Those components may be either integrated together on a single chip or provided as separate parts. Alternatively, the functions of those components may also be performed by a combination of a CPU (central processing unit) and a storage medium that has stored thereon a program to operate the CPU.

Before it is described in detail how the spatial resolution upconverter section 112 and the temporal resolution upconverter section 113 operate, the temporal and spatial resolution properties of the human visual system will be described.

Figure 3:
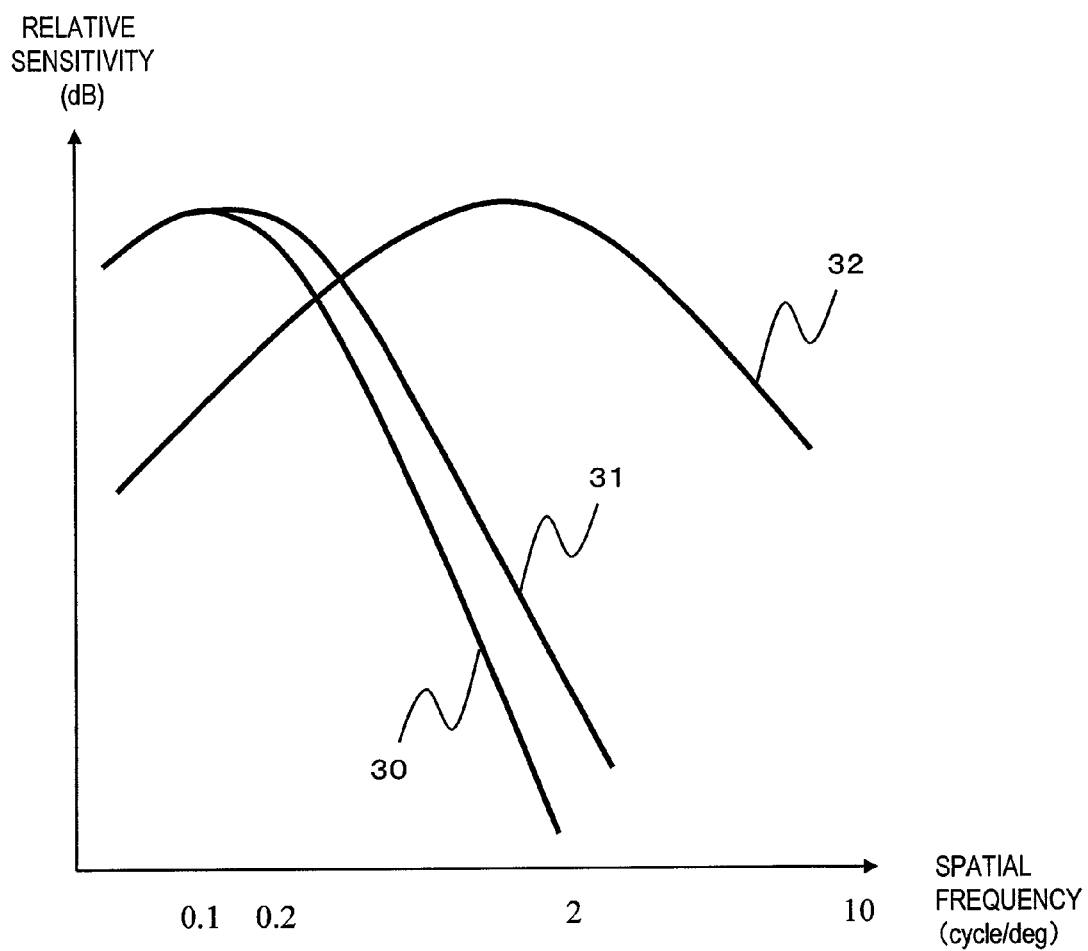
FIG. 3 shows the distributions of sensitivities that are plotted with respect to the spatial resolution.

In short, the temporal and spatial resolution properties of the human visual system are sensitive to not so much a difference in "color" as a difference in "luminance". FIG. 3 shows the distributions of sensitivities that are plotted with respect to the spatial resolution and is transcribed from the document entitled "Color Science Handbook $2^{nd}$ Edition", University of Tokyo Press, June 1998 (see pages 1022 and 1023, among other things). Specifically, the curve 30 represents the relative sensitivity when a stripe pattern, produced due to a color difference between yellow and blue, is viewed. If a stripe pattern is presented in 0.1 to 0.2 periods per degree of the viewing angle, such a pattern is most easily recognizable to the human eye. However, if a stripe pattern is presented in two periods per degree of the viewing angle, the color difference between yellow and blue is no longer sensible to the human eye. On the other hand, the curve 31 represents the relative sensitivity when a stripe pattern, produced due to a color difference between red and green, is viewed. The resultant sensitivity was higher than the combination of yellow and blue but displayed roughly the same tendency. Meanwhile, the curve 32 represents the relative sensitivity when a stripe pattern, produced due to a difference in brightness (i.e., difference between white and black), is viewed. The peak of sensitivity is located where the pattern is presented in two periods per degree of the viewing angle.

Thus, it can be seen that the human eye is clearly more sensitive to such a difference in brightness than to a difference in color. Almost the same tendency was developed as for the temporal resolution. And it is reported that the sensitivity curve representing a luminance difference covers a broader range, and has a higher critical frequency (under which there is no sensitivity anymore), than a sensitivity curve representing a color difference.

Figure 4:
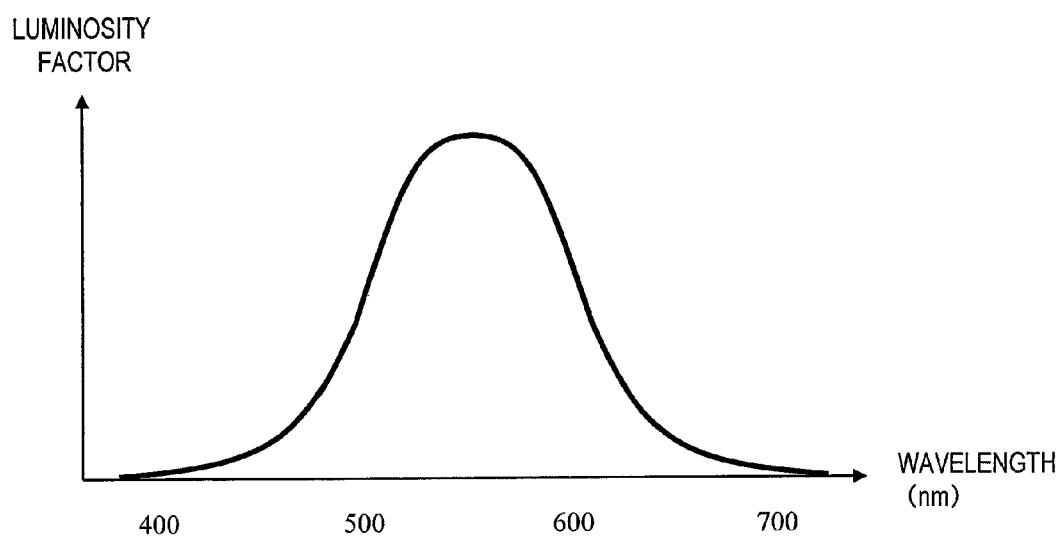
FIG. 4 shows the spectral sensitivity property of the human eye.

Considering such temporal and spatial resolution properties of the human eye, luminance information should be given a higher priority than color information to shoot, record and play an image of quality. Thus, according to the present invention, one of R, G and B images that would contribute to luminance more greatly than the others is shot with high resolution, and the other images that would contribute less effectively to luminance are shot with low resolution. Then, the data transfer rate can be decreased with the influence on image quality minimized. FIG. 4 shows the spectral sensitivity property of the human eye and is transcribed from the document entitled "Color Engineering", Tokyo Denki University Press, December 1993 (see page 12). The human eye is more sensitive to G in the middle wavelength range but less sensitive to R with longer wavelengths or B with shorter wavelengths. That is why among R, G and B images, the G image would contribute most greatly to luminance. And considering the resolution properties of the human eye, too, to realize good image quality, it is important that the G imaging sensor section 106 should use high resolution for shooting. As for the luminosity factor, there is some individual difference. Statistically speaking, however, light in the wavelength range with the highest luminosity factor would be green light. Thus, in preferred embodiments of the present invention to be described below, light falling within the wavelength range with the highest luminosity factor among R, G and B light beams is supposed to be green (G) light beam and the light beams falling within the remaining wavelength ranges other than the wavelength range with the highest luminosity factor are supposed to be red (R) and blue (B) light beams.

It should be noted that if the light beam falling within the wavelength range with the highest luminosity factor is non-green light beam, the light beam in such a color could be selected as the one falling within the wavelength range with the highest luminosity factor. That is to say, such a light beam does not always have to be a green light beam.

Also, if it is known in advance that the image to be shot would have a lot of non-green color components (e.g., blue components in a scene where the image should be captured under sea water or in a swimming pool), then the color blue may be captured with high spatial resolution and low temporal resolution and the colors red and green may be captured with low spatial resolution and high temporal resolution. Then, a color moving picture that would look with good image quality to the viewer's eye can be presented to him or her.

Thus, from the standpoints shown in FIGS. 3 and 4, the G imaging sensor section 106 is supposed to have high spatial resolution and low temporal resolution and shoot high-spatial-resolution images at the times t1 and t15 as shown in FIG. 2A. On the other hand, the R and B imaging sensor sections 105 and 107 are supposed to have low spatial resolution and high temporal resolution and always shoot low-spatial-resolution images from the time t1 through the time t15 as shown in FIG. 2A. As a result, at the times t1 and t15, a G image that would determine the image quality is captured with high spatial resolution. Since the spatial resolution is given a higher priority, no G images can be captured from the time t2 through the time t14. However, thirteen G images can be generated with high spatial resolution from the time t2 through the time t14, respectively, based on the high-spatial-resolution images captured at the times t1 and t15, thereby producing G images 122 with high spatial resolution and high temporal resolution. As for the R and B images, on the other hand, only an image with low spatial resolution can be captured at every time from t1 through t15. Nevertheless, as R and B images would contribute less to luminance, the image quality that should be sensed by the human viewer would be affected much less. Meanwhile, the R and B images have high temporal resolution that will be used by the temporal resolution upconverter section 113 to generate a G image from the time t2 through the time t14 as will be described later. Hereinafter, it will be described in further detail, based on these ideas, how the spatial and temporal resolution upconverter sections 112 and 113 operate.

FIG. 5 shows on what principle the temporal resolution upconverter section 113 generates the G image 122 (see FIG. 2C). Specifically, FIG. 5(a) shows how to learn the relation between a low-spatial-resolution image and a high-spatial-resolution image in principle, while FIG. 5(b) shows how to generate the G image 122 in principle by reference to the relation between the spatial resolutions that has been learned.

The temporal resolution upconverter section 113 associates a first predetermined pixel in the G image with a second pixel, which is located, in the R and/or B image(s) with raised resolution, at the same pixel location as the first pixel, and retains their correspondence. Next, the temporal resolution upconverter section 113 determines a third pixel, which has a higher degree of similarity to a second pixel portion of the R and/or B image(s) with the raised resolution that has been captured at a different time from the G image than any other pixel. In other words, the temporal resolution upconverter section 113 determines a second pixel, which has a higher degree of similarity to a third pixel portion of the R and/or B image(s) converted that has been captured at a different time from the G image than any other pixel, from multiple second pixels included in the correspondences retained. Then, the temporal resolution upconverter section 113 allocates an image portion of the first pixel that has been associated with the second pixel to a fourth pixel, which is located, in the G image, at the same pixel location as the third pixel, thereby generating a G image 122 for a timing at which the G image has not been captured. Hereinafter, it will be described in detail exactly how to generate the G image 122.

In FIG. 5(a), the base image set 130 is a set of R, G and B images 117, 118 and 119 that have been acquired at the same time as the time t1 or t15 shown in FIG. 2A. To tell "an R image 117 that covers the period from the time t1 through the time t15" from "an R image 117 at the time t1 or the time t15", the latter image will be referred to herein as an "R base image 131". Likewise, to avoid confusing "a G image 118 that covers the period from the time t1 through the time t15" from "a G image 118 at the time t1 or the time t15", the latter image will be referred to herein as a "G base image 132". And to distinguish "a B image 119 that covers the period from the time t1 through the time t15" from "a B image 119 at the time t1 or the time t15", the latter image will be referred to herein as a "B base image 133". Since the G image that remains a missing one from the time t2 through the time t14 is generated based on the G base image 132 in the base image set 130, the G base image 132 can be defined as a resource for generating the G image. To generate such a missing G image, the processing of finding an appropriate G image generating resource from the G base image 132 is carried out based on the R and B images that are always captured from the time t2 through the time t14. That is why by using the base image set 130 that includes all of the R, G and B images, the relation between the low spatial resolution of the R and B base images 131 and 133 and the high spatial resolution of the G base image 132 is established and then stored in a G image generating database section 140.

To make the R and B base images 131 and 133 correspond with the G image, their spatial resolution may be increased by interpolation and expansion so that their number of pixels and number of lines agree with those of the G image. In this case, according to an upsampling technique by interpolation, the number of pixels and the number of lines are increased by interpolating pieces of existent information. That is why such a technique has a limit when it comes to generating high frequency components and will normally generate a somewhat blurred enlarged image. That is to say, according to a cubic convolution technique, by which the weights of two points that precede and succeed an interpolation point are determined by sinc function, the upper limit of a waveform frequency that can be restored by interpolation and expansion becomes a half as high as the sample rate. However, since the R and B images are just pieces of reference information for finding a resource for increasing the spatial resolution from the G image, there is no need to restore the high frequency components of an image with a high spatial resolution perfectly. For that reason, if an intermediate value can be calculated by applying the interpolation technique to the existent information, the resource for increasing the spatial resolution could be found from the G image.

Figure 6:
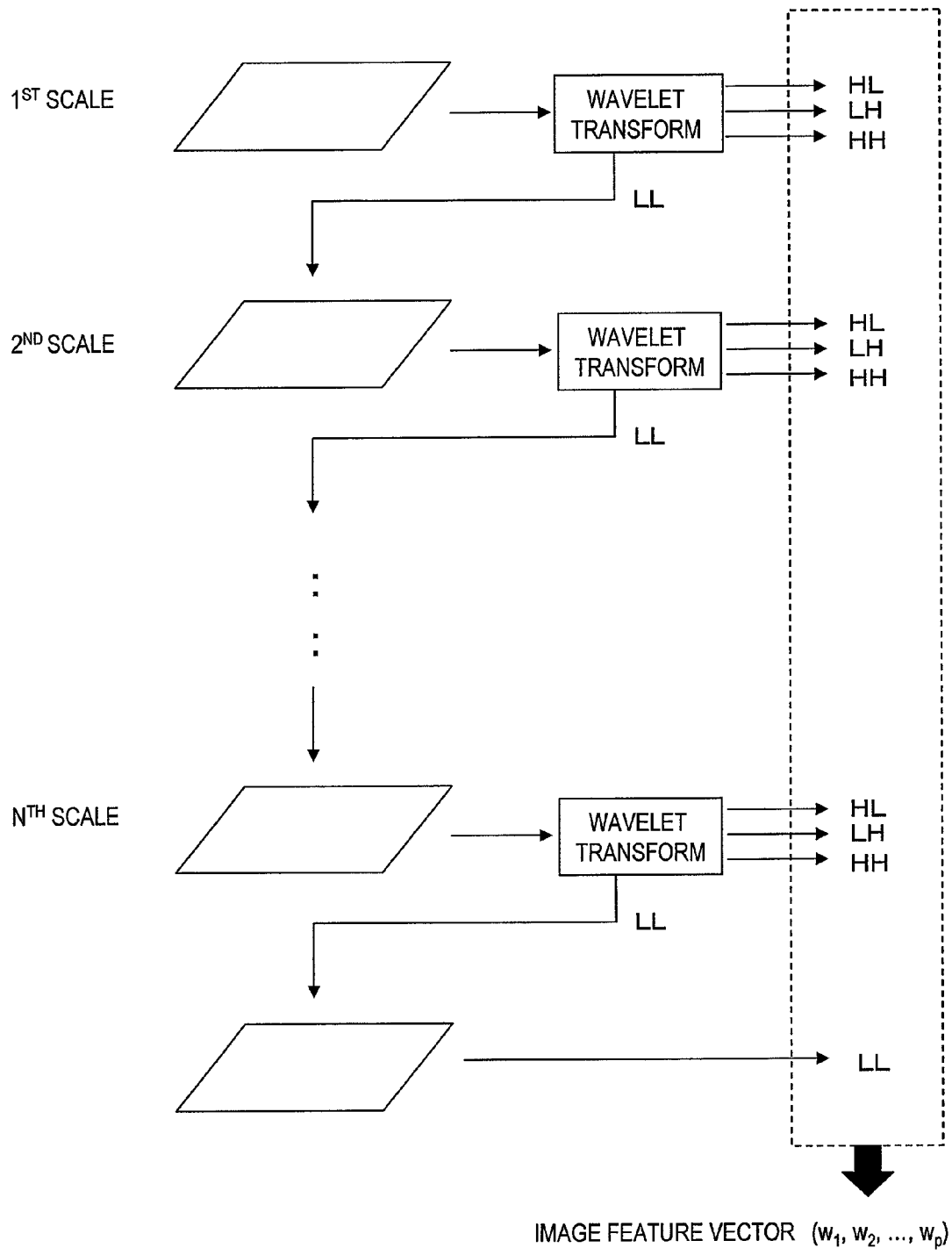
FIG. 6 illustrates an example of a multi-resolution representation by Wavelet transform.

The interpolated and expanded R and B images 134 and 135 and the G base image 132 are transformed into image feature quantities by a frequency analyzer. In FIG. 5, those image feature quantities are identified by f. For example, what is obtained by transforming $G_{H,L}$ into an image feature quantity is identified by $fG_{H,L}$. According to the present invention, the image feature quantity may be defined arbitrarily but could be represented by a multi-dimensional vector that uses the coefficients of Wavelet transform as elements as shown in FIG. 6. That is to say, by obtaining the outputs HL, LH, HH and LL of the Wavelet transform for each of a number n of scales and adding them together on a hierarchy basis, a (3n+1)-dimensional vector can be obtained. For example, if the scale level n is three, the image feature quantity will be ten-dimensional image feature vector $(w_1, w_2, \ldots w_{10})$.

Those outputs HL, LH, HH and LL of the Wavelet transform are coefficients to be obtained when the Haar mother Wavelet is adopted. As shown in FIG. 7(a), HL is the difference between a pixel 60 of interest and a horizontally adjacent pixel 61 on the right-hand side, LH is the difference between the pixel 60 and a vertically adjacent pixel 62 under the pixel 60, HH is the difference between the pixel 60 and a diagonally adjacent pixel 63 on the lower right hand side, and LL is the average of these four pixels consisting of the pixel 60 and the three adjacent pixels located on the right-hand side of the pixel 60, right under the pixel 60, and on the lower right hand side of the pixel 60. The $1^{st}$ scale is illustrated in FIG. 7(a), while the $2^{nd}$ scale is illustrated in FIG. 7(b). At the $2^{nd}$ scale, it is the output LL (which is the average of the four pixels at the $1^{st}$ scale) that the difference should be calculated on. Specifically, at the $2^{nd}$ scale, the output HL is the difference between blocks 64 and 65, the output LH is the difference between blocks 64 and 66, the output HH is the difference between blocks 64 and 67, and the output LL is the average of all of these blocks 64 through 67.

Figure 8:
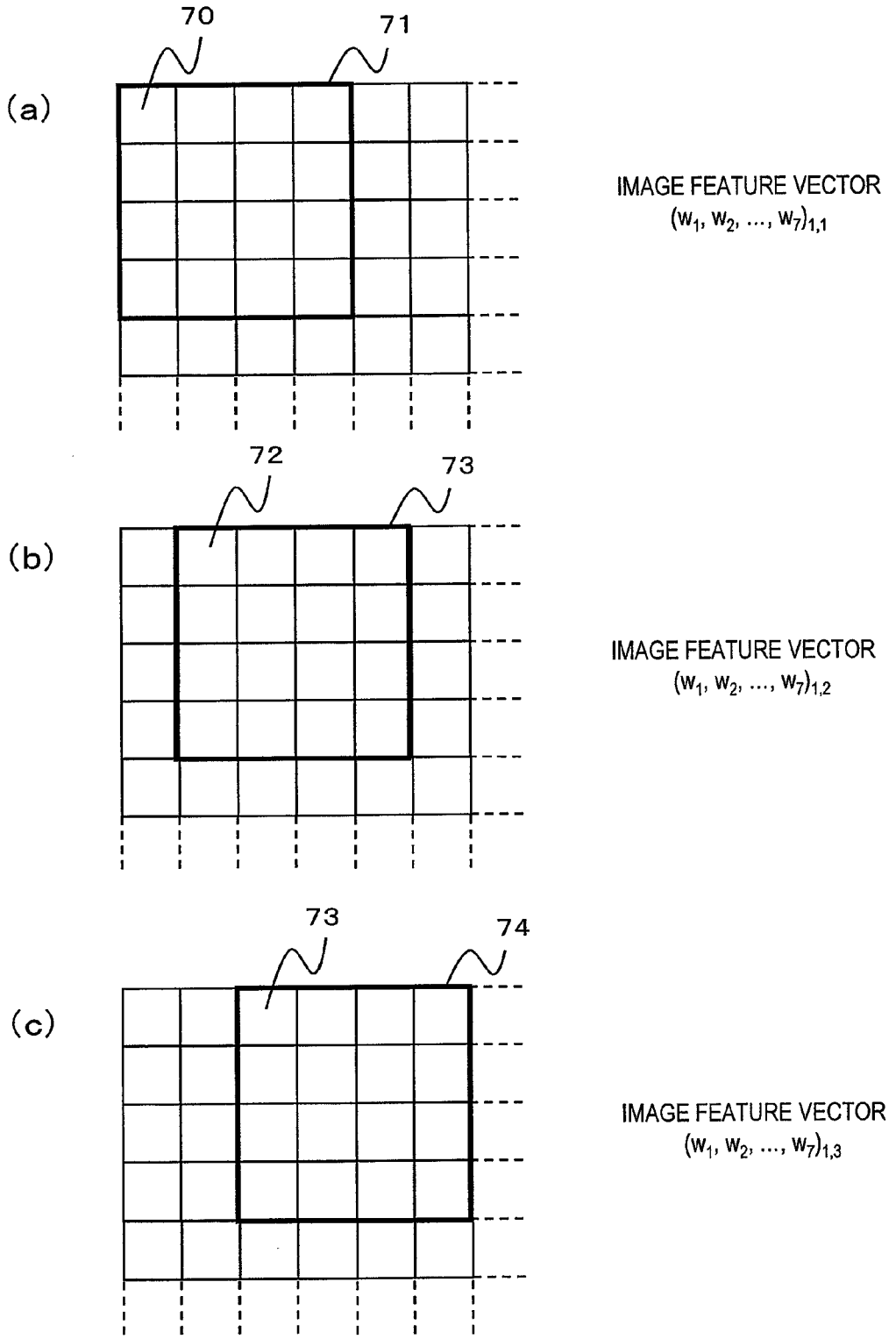
FIGS. 8(*a*) to 8(*c*) illustrate how to calculate the image feature quantity on a pixel-by-pixel basis when the scale level n is two.

FIG. 8 illustrates how to calculate the image feature quantity on a pixel-by-pixel basis when the scale level n is two, for example. Specifically, FIG. 8(a) shows how to calculate the image feature quantity $(w_1, w_2, \ldots w_7)_{1,2}$ of a pixel 70. In this case, a seven-dimensional image feature quantity is calculated by Wavelet transform with reference to the 16 pixels inside the block 71. Likewise, FIG. 8(*b*) shows how to calculate the image feature quantity ($w_1, w_2, \ldots w_7$)$_{1,2}$ of a pixel 72. In this case, a seven-dimensional image feature quantity is calculated by Wavelet transform with reference to the 16 pixels inside the block 73. Furthermore, FIG. 8(*c*) shows how to calculate the image feature quantity ($w_1, w_2, \ldots w_7$)$_{1,3}$ of a pixel 73. In this case, a seven-dimensional image feature quantity is calculated by Wavelet transform with reference to the 16 pixels inside the block 74. By shifting the Wavelet transform reference block on a pixel-by-pixel in this manner, the image feature quantity can be calculated for one pixel after another.

There are two low-spatial-resolution images (i.e., the R and B images in this case). That is why by combining the p-dimensional image feature vector R image 136 and the p-dimensional image feature vector B image 137 together, a 2p-dimensional image feature vector RB image 138 (see FIG. 5(*a*)) is obtained. Meanwhile, the G base image 132 is also transformed into an image feature quantity, thereby generating a p-dimensional image feature vector G image 139. The G image generating database section 140 functions as a dictionary for associating the respective image feature quantities of the image feature vector RB image 138 and the image feature vector G image 139 at the same pixel location with each other (i.e., associating first and second pixels with each other) and replacing a low-spatial-resolution image feature vector with a high-spatial-resolution image feature vector. In this preferred embodiment, G pixels are arranged as a matrix of 1,920 pixels×1,080 lines, and therefore, approximately 2.07 million sets of image feature vector replacement information are stored in the G image generating database section 140. Also, since two pictures of the G image are obtained at the times t1 and t15, the number of pieces of image feature vector replacement information that can be referred to in order to increase the spatial resolution becomes approximately 4.14 million. That is to say, the G image that becomes a missing one from the time t2 through the time t14 is filled with some of the 4.14 million G image feature vectors.

In FIG. 5(*b*), the image set 150 includes R and B images 151 and 152 from the time t2 through the time t14. The R and B images 151 and 152 are converted by the same interpolation and expansion method as the one shown in FIG. 5(*a*) to have the same number of pixels and the same number of lines as the G image, thereby generating R and B images 153 and 154. Next, the R and B images 153 and 154 are transformed into image feature quantities by the same method as the one shown in FIG. 5(*a*), thereby generating a p-dimensional image feature vector R image 155 and a p-dimensional image feature vector B image 156. These p-dimensional image feature vector R and B images 155 and 156 are combined with each other to produce a 2p-dimensional image feature vector RB image 157. Then, the degree of similarity of image feature vector between the 2p-dimensional image feature vector RB image 157 and a 2p-dimensional image feature vector RB image 138 in the G image generating database section 140 is determined on a pixel-by-pixel basis. That is to say, similar pixels are located as the third and second pixels, respectively, in these RB images 157 and 138, thereby selecting a similar RB image feature vector 158. Subsequently, an image feature vector at the same pixel location (i.e., the first pixel) as the similar RB image feature vector 158 is extracted from the image feature vector G image 139 and used as a similar G image feature vector 159. By associating the similar G image feature vector 159 with the pixel (i.e., the fourth pixel) that has the same coordinates (i.e., is present at the same location) as the pixel of interest in the RB image 157 (i.e., the third pixel), a replaced image feature vector G image 160 is generated.

Any arbitrary method may be used to select the similar RB image feature vector 158. For example, an image feature vector that has the shortest distance from the 2p-dimensional image feature vector RB image 157 may be selected from the G image generating database section 140. Alternatively, a number of candidate image feature vectors, of which the distances from the 2p-dimensional image feature vector RB image 157 are shorter than a predetermined reference distance, may be extracted, image feature vectors at the same pixel locations as those candidate image feature vectors extracted are picked from the image feature vector G image 139, and then those two groups of image feature vectors are averaged to obtain similar G image feature vectors 159.

Still alternatively, a few (e.g., three) candidate image feature vectors, of which the distances from the 2p-dimensional image feature vector RB image 157 are the shortest, the second shortest and the third shortest, respectively, may be extracted, image feature vectors at the same pixel locations as those candidate image feature vectors extracted are picked from the image feature vector G image 139, and then those two groups of image feature vectors are averaged to obtain similar G image feature vectors 159.

The similar G image feature vector 159 is an image feature quantity with high spatial resolution. And since the similar RB image feature vector 158 has been replaced with the similar G image feature vector 159, the spatial resolution has been raised. At every pixel of the image feature vector RB image 157, the similar RB image feature vector 158 has been replaced with the similar G image feature vector 159 with reference to the G image generating database section 140, thereby generating a replaced image feature vector G image 160. Then, the replaced image feature vector G image 160 is subjected to the inverse one of the image feature quantity transform so as to be restored into a luminance image and generate a replaced and resolution increased G image 161. By calculating the replaced and resolution increased G image 161 from the time t2 through the time t14, the G image 122 shown in FIG. 2C is generated and the temporal resolution can be increased.

Figure 9:
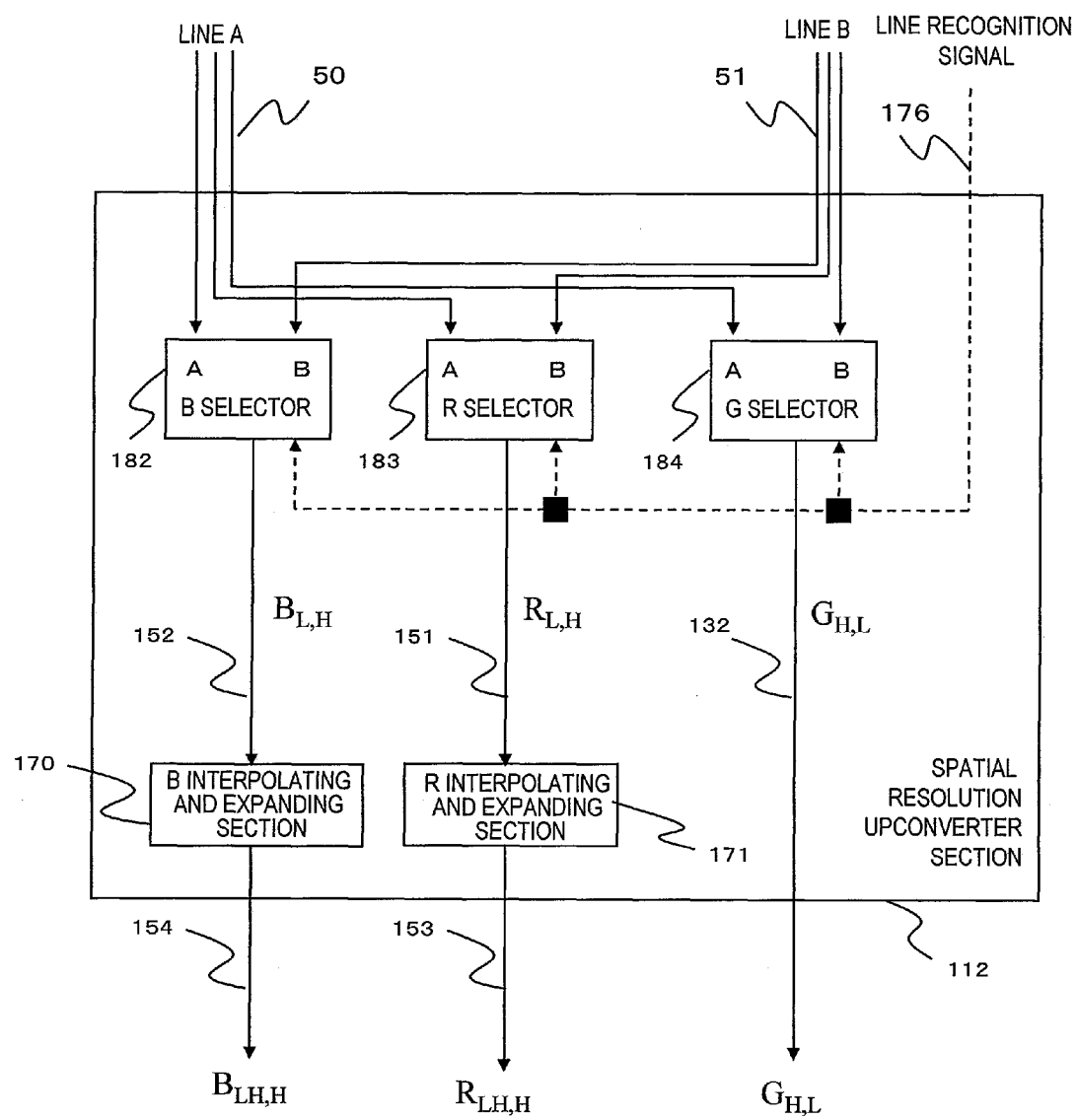
FIG. 9 is a block diagram illustrating a configuration for the spatial resolution upconverter section 112.

FIG. 9 is a block diagram illustrating a configuration for the spatial resolution upconverter section 112. The inputs from the Line A 50 and the Line B 51 are switched by B, R and G selectors 182, 183 and 184 in accordance with a line recognition signal 176. A B interpolating and expanding section 170 increases the spatial resolution of the low-spatial-resolution, high-temporal-resolution B image 152 by interpolation and expansion, thereby outputting a high-spatial-resolution, high-temporal-resolution B image 154. Likewise, an R interpolating and expanding section 171 increases the spatial resolution of the low-spatial-resolution, high-temporal-resolution R image 151 by interpolation and expansion, thereby outputting a high-spatial-resolution, high-temporal-resolution R image 153. However, the high-spatial-resolution, low-temporal-resolution G image 132 included in the base image 130 shown in FIG. 5(*a*) to learn the relation between high- and low-spatial-resolution images does not have to have its resolution increased while an image shot is being played back. That is why the high-spatial-resolution, low-temporal-resolution G image 132 is just output as it is through the spatial resolution upconverter section 112. Optionally, the B interpolating and expanding section 170 and the R interpolating and expanding section 171 may be combined with each other so that the B image, and then the R image, are interpolated and expanded time-sequentially.

Figure 10:
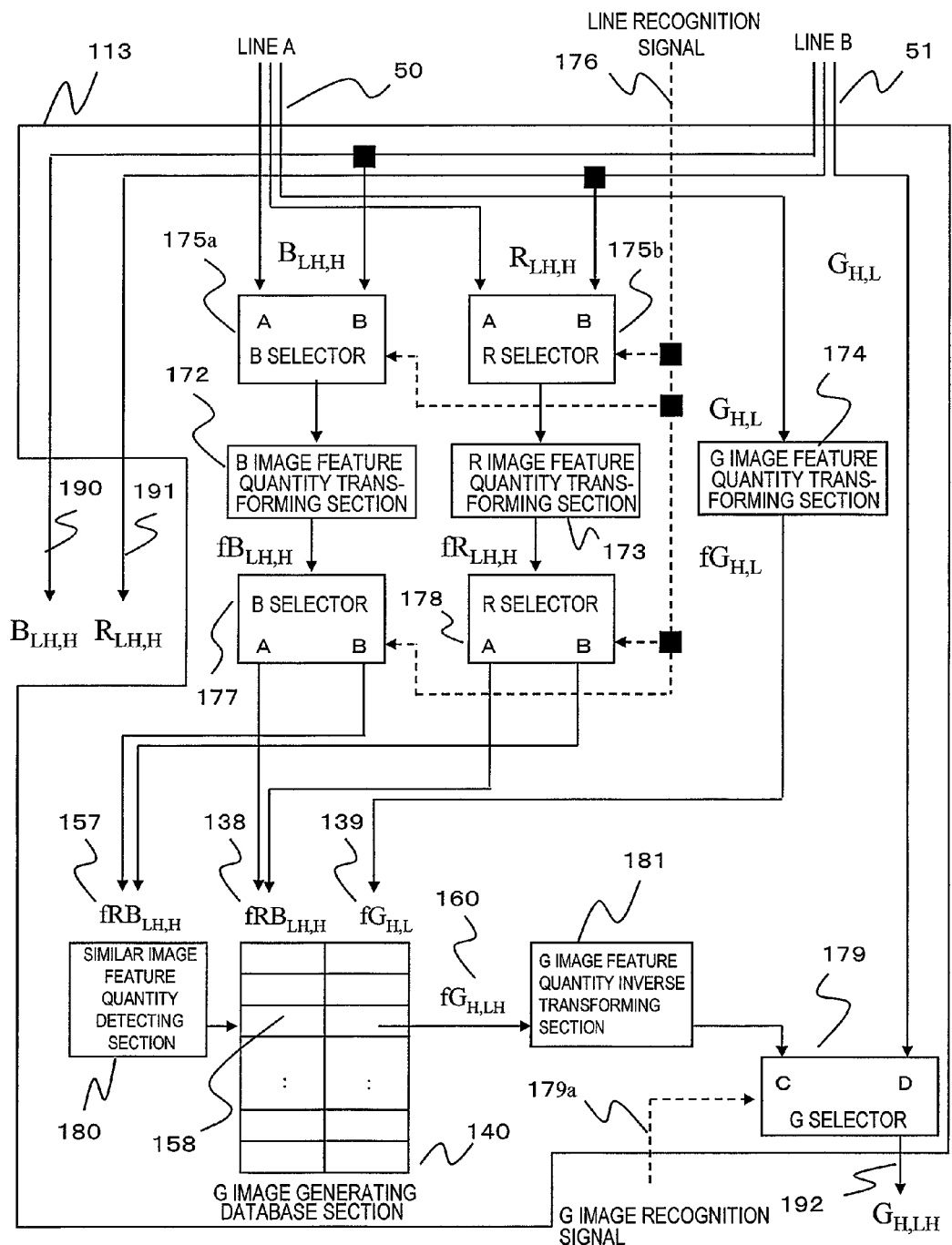
FIG. 10 is a block diagram illustrating a configuration for the temporal resolution upconverter section 113.

FIG. 10 is a block diagram illustrating a configuration for the temporal resolution upconverter section 113.

To generate data to be stored in the G image generating database section 140, the Line A 50 supplies the image shot, which has been read from the memory section 110, to B, R and G image feature quantity transforming sections 172, 173 and 174 by way of the spatial resolution upconverter section 112. Among these three transforming sections, the B and R image feature quantity transforming sections 172 and 173 are also supplied with an image shot by the Line B 51 while the image shot is being played back, as will be described later. That is why the image shots supplied from the Line A 50 and the Line B 51 are switched by a B selector 175a and an R selector 175b. The inputs to the selectors may be switched in accordance with the line recognition signal 176 so that the input from either the Line A 50 or the Line B 51 is supplied to the B and R image feature quantity transforming sections 172 and 173. The image shot that has been read from the memory section 110 is converted into an image feature vector by the B or R image feature quantity transforming section 172 or 173, which is passed through the B selector 177 or R selector 178 and then provided for the input end of the G image generating database section 140. That image feature vector corresponds to the image feature quantity of the image feature vector RB image 138 shown in FIG. 5. On the other hand, the output of the G image feature quantity transforming section 174 is provided for the output end of the G image generating database section 140. This corresponds to the image feature vector of the image feature vector G image 139.

By performing these operations, the association between the low-spatial-resolution image and the high-spatial-resolution image shown in FIG. 5(a) has been learned completely. As the G image generating database section 140, any arbitrary storage medium such as a hard disk that uses a magnetic material or a semiconductor memory can be used. If the storage medium used is removable from the apparatus 100 for shooting, recording and playing an image, the data in the G image generating database section 140 can be either moved or copied to another device. Optionally, instead of such a removable storage medium, an interface having the ability to communicate with the network can also be used.

Meanwhile, the Line B 51 supplies the image shot that has been read from the memory section 110 while the image shot is being played to the temporal resolution upconverter section 113 by way of the spatial resolution upconverter section 112. Since the G image 118 with high spatial resolution is captured at the times t1 and t15 shown in FIG. 2A, the temporal resolution upconverter section 113 does not have to generate the G image. That is why if there is such a G image 118 with high spatial resolution as seen at the times t1 and t15 shown in FIG. 2A, then the G image 118 is just output as it is. On the other hand, if the G image 118 is missing as seen from the time t2 through the time t14 shown in FIG. 2A, a G image 122 with high spatial resolution such as the G image 122 shown in FIG. 2C should be generated. To change these modes, the G selector 179 is used and a G image recognition signal 179a is given to indicate whether or not there is any G image 118.

The R and B images that have been supplied through the Line B 51 have had their spatial resolution once increased by the spatial resolution upconverter section 112 and correspond to the R and B images 153 and 154 shown in FIG. 5. These images are just output as they are (i.e., an output B image 190 and an output R image 191) from the temporal resolution upconverter section 113. At the same time, to generate the replaced and resolution increased G image 161 shown in FIG. 5, those images are also supplied to the B and R image feature quantity transforming sections 172 and 173 by way of the B and R selectors 175a and 175b, respectively. The B image feature quantity transforming section 172 outputs the image feature vector B image 156 shown in FIG. 5(b), while the R image feature quantity transforming section 173 outputs the image feature vector R image 155 shown in FIG. 5(b). Thereafter, these image feature vector R and B images 155 and 156 are combined with each other by the similar image feature quantity detecting section 180 to be an image feature vector RB image 157.

Subsequently, the image feature vector RB image 157 has its distance compared to that of the image feature vector RB image 138 that has been written on the input end of the G image generating database section 140 through the Line A 50, thereby detecting a similar RB image feature vector 158. Also, the G image feature vector that has been stored at the output end of the G image generating database section 140 is output as the similar G image feature vector 159, which is restored by the G image feature quantity inverse transforming section 181 into a luminance image, thereby obtaining an output G image 192.

The output section 114 receives the output B, R and G images 190, 191 and 192 from the temporal resolution upconverter section 113 and outputs them to a device outside of the shooting, recording and playback system 100.

The line recognition signal generating section 185 generates the line recognition signal 176 and supplies it to the image shot storage section 108, the spatial resolution upconverter section 112, and the temporal resolution upconverter section 113. In the image shot storage section 108, the image shot reading section 111 changes the sources of reading from the Line A 50 into the Line B 51, or vice versa, in response to the line recognition signal 176. The spatial resolution upconverter section 112 and the temporal resolution upconverter section 113 also change the sources from the input through the Line A 50 into the input through the Line B 51, or vice versa. If the line recognition signal 176 has specified the Line A 50, the image shot reading section 111 retrieves only the base image set 130 shown in FIG. 5(a) from the memory section 110, the spatial resolution upconverter section 112 equalizes the spatial resolution of the R and B images with that of the G image by interpolation and expansion, and the temporal resolution upconverter section 113 stores the image feature vector RB image 138 and the image feature vector G image 139 on the G image generating database section 140. On the other hand, if the line recognition signal 176 has specified the Line B 51, the image shot reading section 111 sequentially retrieves one image shot after another from the memory section 110, the spatial resolution upconverter section 112 equalizes the spatial resolution of the R and B images with that of the G image by interpolation and expansion, and the temporal resolution upconverter section 113 generates the replaced and resolution increased G image 161 with reference to the G image generating database section 140.

In the example that has already been described with reference to FIG. 5, the base image set 130 is supposed to be obtained at either the time t1 or the time t15. However, the information that has been acquired at both of these times t1 and t15 could be introduced into the base image set 130 as well. That is to say, any number of pictures could be put into the base image set according to the present invention.

Likewise, according to the present invention, a number of pictures may be introduced into the base image set at any time interval.

Also, if the image feature quantities in the G image generating database section 140 are similar to each other and have a high degree of redundancy, then the size of the G image generating database section 140 may be reduced by performing a clustering process that aggregates a number of similar data into a single piece of representative data. For example, if three base images, each consisting of 720 pixels×480 lines, are used and if the number of scales shown in FIG. 6 is three, then approximately one million (=720 pixels×480 lines× three) sets of 10-dimensional image feature vectors will be calculated. In that case, 10 thousand image feature vectors may be defined around an initial cluster by using random numbers generated, for example, and an image feature vector that is closest to the one at the center of each cluster is detected from the one million image feature vectors. Then, the average between the image feature vector detected and the one at the center of the cluster is calculated to update the center of the cluster. In this manner, the center of the cluster is repeatedly updated until the average between every single one of the one million image feature vectors and the one at the center of the cluster is calculated, thereby eventually obtaining 10 thousand image feature vectors. Optionally, clustering could be replaced with a main component analysis. In that case, the breadth of the distribution of those one million image feature vectors may be represented by a linear combination of multiple base vectors, thereby cutting down the degree of redundancy.

Figure 11:
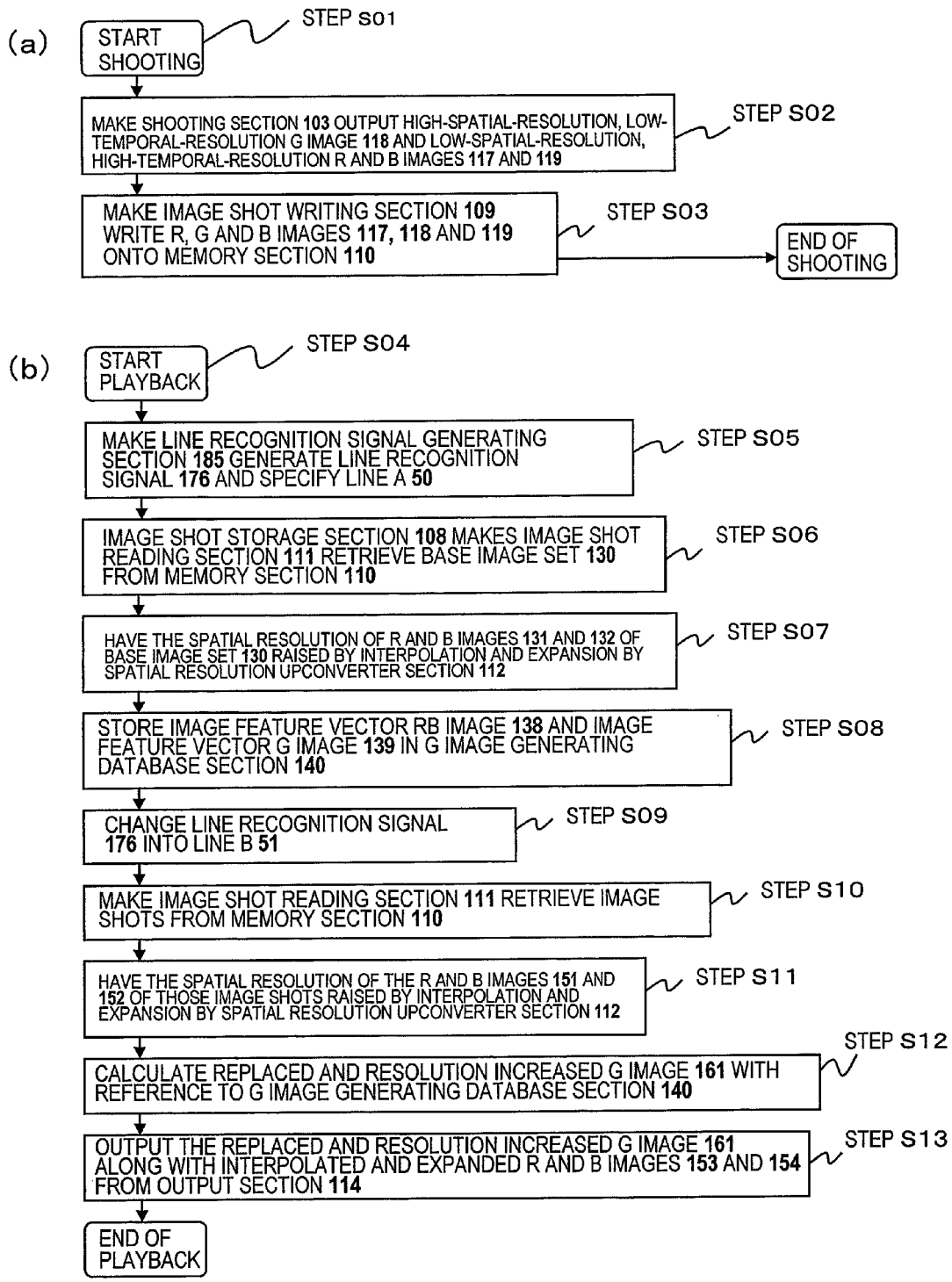
FIGS. 11(*a*) and 11(*b*) show the flows of operations to be done by the shooting, recording and playback system 100.

FIG. 11 shows the flows of operations to be done by the shooting, recording and playback system 100. Specifically, FIG. 11(a) is a flowchart showing the procedure of shooting and recording operations. On the other hand, FIG. 11(b) is a flowchart showing the procedure of operations for playing back an image shot. In FIG. 11(a), when shooting is started (in Step S01), the shooting section 103 receives the incoming light 101 and outputs the high-spatial-resolution, low-temporal-resolution G image 118, and the low-spatial-resolution, high-temporal-resolution R and B images 117 and 119 (in Step S02). Next, the image shot storage section 108 makes the image shot writing section 109 write the R, G and B images 117, 118 and 119 onto the memory section 110 (in Step S03). In FIG. 11(b), when the image shot starts to be played (in Step S04), the line recognition signal generating section 185 generates a line recognition signal 176 and specifies the Line A 50 (in Step S05). Then, the image shot storage section 108 makes the image shot reading section 111 retrieve the base image set 130 from the memory section 110 (in Step S06). Next, the base image set 130 has the spatial resolution of its R and B images 131 and 132 raised by interpolation and expansion by the spatial resolution upconverter section 112 (in Step S07). As a result, the image feature vector RB image 138 and the image feature vector G image 139 are stored in the G image generating database section 140 of the temporal resolution upconverter section 113 (in Step S08).

After the processing step S08 has been performed, the line recognition signal generating section 185 changes the levels of the line recognition signal 176 into the Line B 51 (in Step S09). The image shot storage section 108 makes the image shot reading section 111 retrieve one image shot after another from the memory section 110 (in Step S10). Next, those image shots have the spatial resolution of their R and B images 151 and 152 raised by interpolation and expansion by the spatial resolution upconverter section 112 (in Step S11). The replaced and resolution increased G image 161 is calculated with reference to the G image generating database section 140 of the temporal resolution upconverter section 113 (in Step S12) and then output, along with the interpolated and expanded R and B images 153 and 154, from the output section 114 (in Step S13).

If the image feature vectors that are kept on record in the G image generating database section 140 are retained even after the playback operation has been finished, then the playback operation can be started next time by performing the processing step S09 with the processing steps S05 through S08 omitted. Particularly if the same scene is going to be shot again, the image feature vectors in the G image generating database section 140 are likely to be used again. That is why the image can be played back quickly without debasing the quality of the high-spatial-resolution, high-temporal-resolution RGB image ($R_{OUT} G_{OUT} B_{OUT}$) 102. When another base image set 130 is newly retrieved from the memory section 110, the lines are changed into the Line A 50 and the processing steps S05 through S08 are performed, thereby updating the image feature vectors in the G image generating database section 140.

In the preferred embodiment described above, a G image is supposed to be captured with high resolution and R and B images are supposed to be captured with low resolution based on the visual properties shown in FIGS. 3 and 4. Actually, however, there is an individual difference in color sensitivity. That is why the high sensitivity region shown in FIG. 4 could not be present in the so-called "G wavelength range" but somewhere else. For example, if the user has high sensitivity with respect to R with longer wavelengths, then an R image may be captured with high resolution and G and B images may be captured with low resolution.

With such a shooting, recording and playback system 100, an image of quality (i.e., with high spatial resolution and high temporal resolution) can be shot, recorded and played using a currently available three-panel camera as it is. For example, a high definition video with a resolution of 1,920 pixels×1,080 lines can be shot with a camcorder for a normal TV set with a resolution of 720 pixels×480 lines. An imager for a normal camcorder is greater in size than a one for a high-definition camcorder, thus allowing the user to shoot an image of quality with high sensitivity more easily.

Embodiment 2

A second specific preferred embodiment of the present invention to be described below is a shooting, recording and playback system that shoots and records a first image with high spatial resolution and low temporal resolution in the G wavelength range with the highest luminosity factor and a second image with low spatial resolution and high temporal resolution in the other R and B wavelength ranges, respectively, converts the temporal resolution of the first image into that of the second image in accordance with the correspondence between the low- and high-spatial-resolution images and plays the image with the converted temporal resolution. The system can synthesize together a number of images with high spatial resolution and high temporal resolution in a luminance/color difference space, thus generating an image of quality with their color balance maintained.

Figure 12:
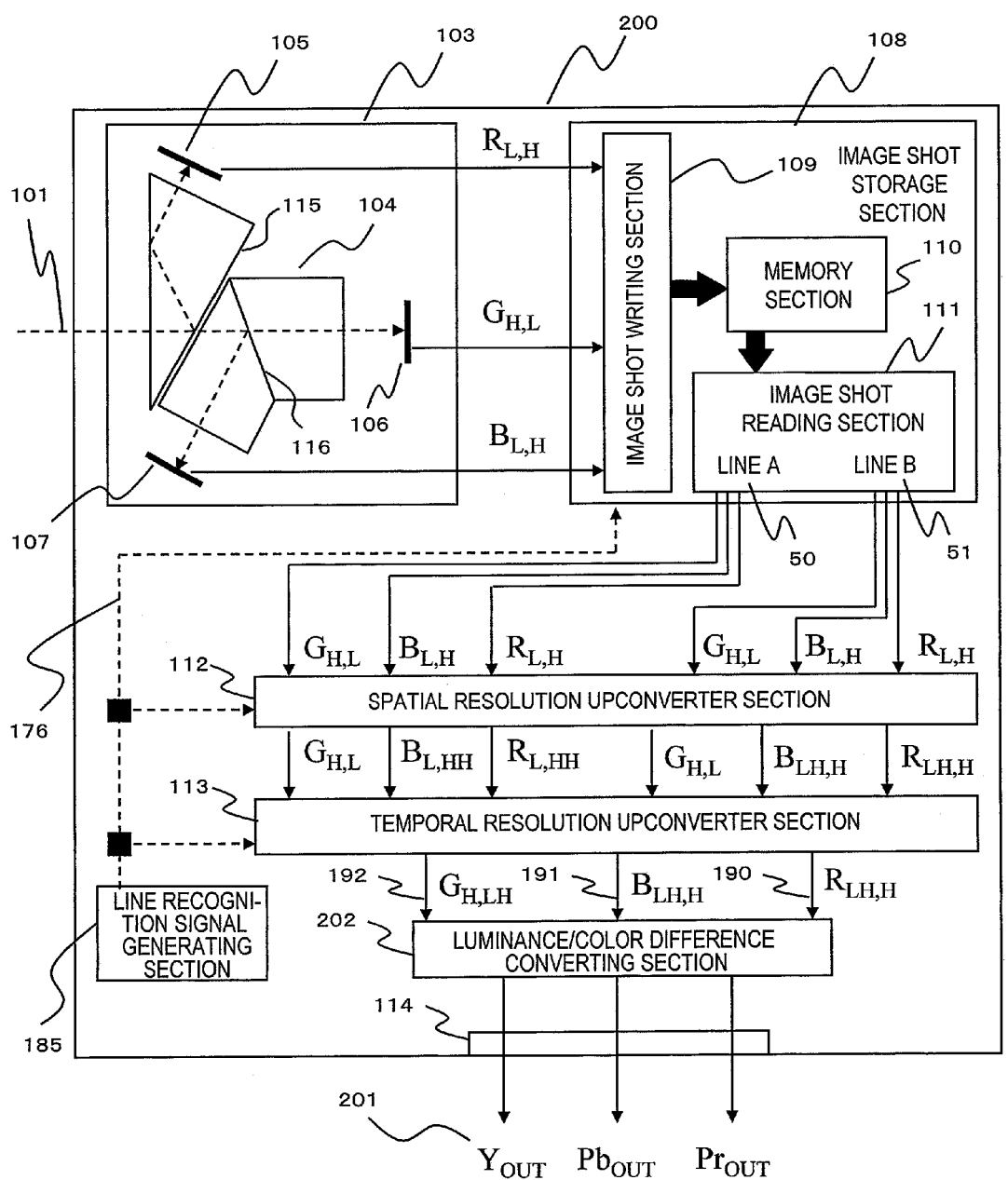
FIG. 12 is a block diagram illustrating a configuration for a shooting, recording and playback system 200 as a second specific preferred embodiment of the present invention.

FIG. 12 is a block diagram illustrating a configuration for a shooting, recording and playback system 200 as a second specific preferred embodiment of the present invention. In FIG. 12, any component also included in the shooting system 100 shown in FIG. 1 and having substantially the same function as its counterpart will be identified by the same reference numeral and the detailed description thereof will be omitted herein. The shooting system 200 is an apparatus that receives incoming light 101, stores an image shot, and then subjects the image shot to be reproduced to resolution raising processing, thereby outputting luminance/color difference images with high spatial resolution and high temporal resolution ($Y_{OUT} Pb_{OUT} Pr_{OUT}$) 201. The system 200 includes a shooting section 103, a color separating section 104, an R imaging sensor section 105, a G imaging sensor section 106, a B imaging sensor section 107, an image shot storage section 108, an image shot writing section 109, a memory section 110, an image shot reading section 111, a spatial resolution upconverter section 112, a temporal resolution upconverter section 113, an output section 114, a line recognition signal generating section 185, and a luminance/color difference converting section 202.

The luminance/color difference converting section 202 converts the R, B and G images 190, 191 and 192 with high spatial resolution and high temporal resolution that have been generated by the temporal resolution upconverter section 113 into the luminance/color difference images 201. The RGB images may be converted into the luminance/color difference images by the following Equations (1) and (2):

$$Y = 0.21R + 0.72G + 0.07B$$

$$Pb = -0.39G - 0.11R + 0.5B + 256$$

$$Pr = -0.45G - 0.05B + 0.5R + 256 \quad (1)$$

$$Y = 0.21R + 0.72G + 0.07B$$

$$Cb = (B - Y)/1.7720$$

$$Cr = (R - Y)/1.4020 \quad (2)$$

As can be seen from these Equations (1) and (2), the G component accounts for 70% of the luminance component Y to which the human visual system is sensitive. That is why if among the RGB components, the G component has the highest spatial resolution, an image of quality with a high degree of sharpness can be generated. The G image 192 is generated based on the image feature quantity of an image that has been shot with the G imaging sensor 106 with high spatial resolution, and therefore, has higher frequency components than the R image 190 or the B image 191 obtained by interpolating and expanding the image that has been shot with the R or B imaging sensor 105 or 107 with low spatial resolution. As a result, an image of quality with a high degree of sharpness can be generated.

Figure 13:
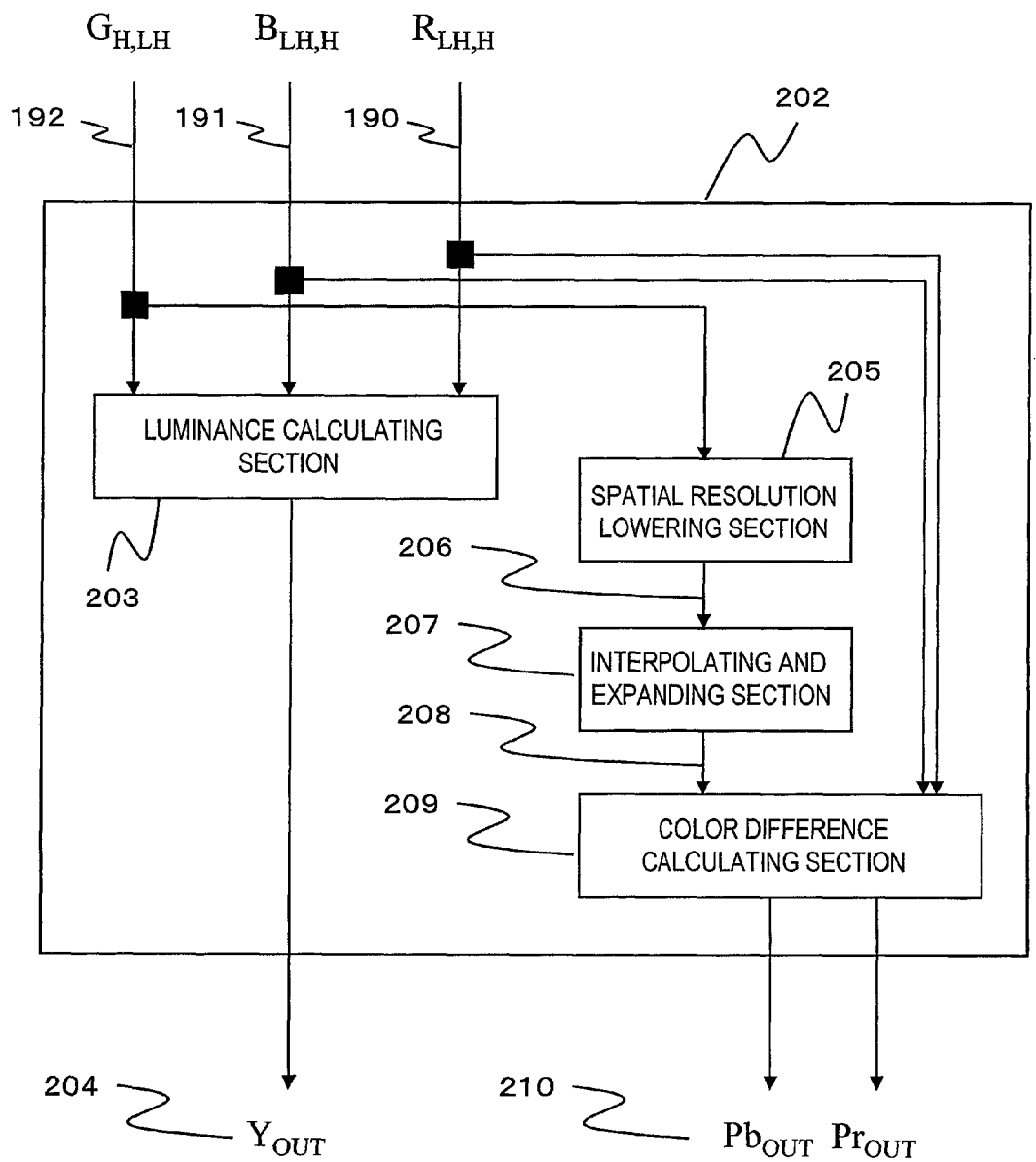
FIG. 13 is a block diagram illustrating a configuration for the luminance/color difference converting section 202.

FIG. 13 is a block diagram illustrating a configuration for the luminance/color difference converting section 202. The luminance calculating section 203 converts the R, G and B images 190, 192 and 191 into a luminance image 204 by one of Equations (1) and (2). The spatial resolution lowering section 205 lowers the spatial resolution of the G image 192 and equalizes it with that of the R and B imaging sensor sections 105 and 107, thereby generating a G image 206. Subsequently, the interpolating and expanding section 207 performs interpolation and expansion on the G image 206 so that the spatial resolution of the G image 206 becomes equal to that of the R and B images 190 and 191, thereby generating another G image 208. By performing these operations, the spatial frequency distribution of the G image 208 can be handled as the same one as that of the R and B images 190 and 191, and therefore, the color balance of RGB can be saved. The color difference calculating section 209 converts the R, B and G images 190, 191 and 208 into a color difference image 210 by Equation (1). Then, the luminance image 204 and the color difference image 210 are combined together to produce the luminance/color difference images 201 with high spatial resolution and high temporal resolution, which are then output by the output section 114 to a device outside of the shooting, recording and playback system 200.

With such a shooting, recording and playback system 200, an image of quality with high spatial resolution and high temporal resolution can be shot, recorded and played using a currently available three-panel camera as it is. The resolutions are raised by making reference to a database as for the G image and by interpolation as for the R and B images. For that reason, the G image is particularly likely to lose the color balance in a region with high frequency components. However, the shooting, recording and playback system 200 described above can convert the G, R and B images with raised resolutions into color difference components and output them so as not to lose the color balance. Meanwhile, as the G image with the raised resolution will contribute to the luminance components, in which the temporal/spatial resolution of the visual system is the highest, more greatly than the R image or the B image, an image of quality with a high degree of sharpness can be generated. Consequently, images of quality, of which the spatial and temporal resolutions should seem to be high to a human viewer's eye, can be synthesized together in a luminance/color difference space and can be generated with their color balance maintained.

Embodiment 3

A third specific preferred embodiment of the present invention to be described below is a shooting, recording and playback system that shoots and records a first image with high spatial resolution and low temporal resolution in the G wavelength range with the highest luminosity factor and a second image with low spatial resolution and high temporal resolution in the other R and B wavelength ranges, respectively, converts the temporal resolution of the first image into that of the second image in accordance with the correspondence between the low- and high-spatial-resolution images and plays the image with the converted temporal resolution. The system can synthesize together a number of images with high spatial resolution and high temporal resolution in a luminance/color difference space, thus generating an image of quality with their color balance maintained. By making a number of pixels share the same color difference component, luminance/color difference images with high spatial resolution and high temporal resolution can be generated with the data size reduced but with the image maintained.

Figure 14:
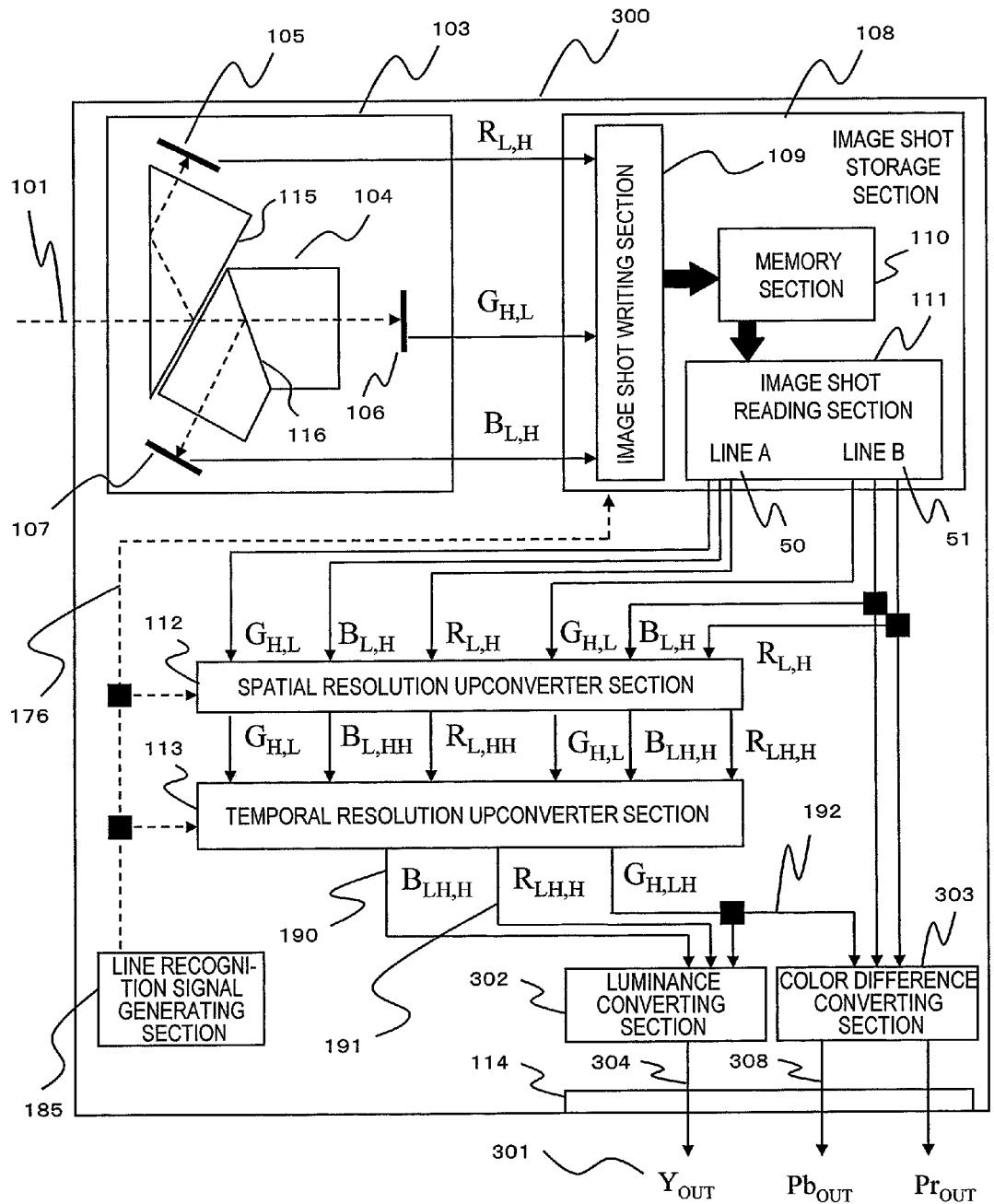
FIG. 14 is a block diagram illustrating a configuration for a shooting, recording and playback system 300 as a third specific preferred embodiment of the present invention.

FIG. 14 is a block diagram illustrating a configuration for a shooting, recording and playback system 300 as a third specific preferred embodiment of the present invention. In FIG. 14, any component also included in the shooting system 100 shown in FIG. 1 and having substantially the same function as its counterpart will be identified by the same reference numeral and the detailed description thereof will be omitted herein. The shooting system 300 is an apparatus that receives incoming light 101, stores an image shot, and then subjects the image shot to be reproduced to resolution raising processing, thereby outputting luminance/color difference images with high spatial resolution and high temporal resolution ($Y_{OUT}$ $Pb_{OUT}$ $Pr_{OUT}$) 301. The system 300 includes a shooting section 103, a color separating section 104, an R imaging sensor section 105, a G imaging sensor section 106, a B imaging sensor section 107, an image shot storage section 108, an image shot writing section 109, a memory section 110, an image shot reading section 111, a spatial resolution upconverter section 112, a temporal resolution upconverter section 113, an output section 114, a line recognition signal generating section 185, a luminance converting section 302 and a color difference converting section 303. The luminance converting section 302 will also be referred to herein as a "luminance generating section", and the color difference converting section 303 will also be referred to herein as a "color difference generating section".

The luminance converting section 302 converts the R, B and G images 190, 191 and 192 with high spatial resolution and high temporal resolution that have been generated by the temporal resolution upconverter section 113 into a luminance image 304 by Equation (1), for example. Just like the luminance calculating section 203 shown in FIG. 13, the luminance converting section 302 generates a luminance image 304 with a high degree of sharpness based on the G image 192 with high frequency components.

Figure 15:
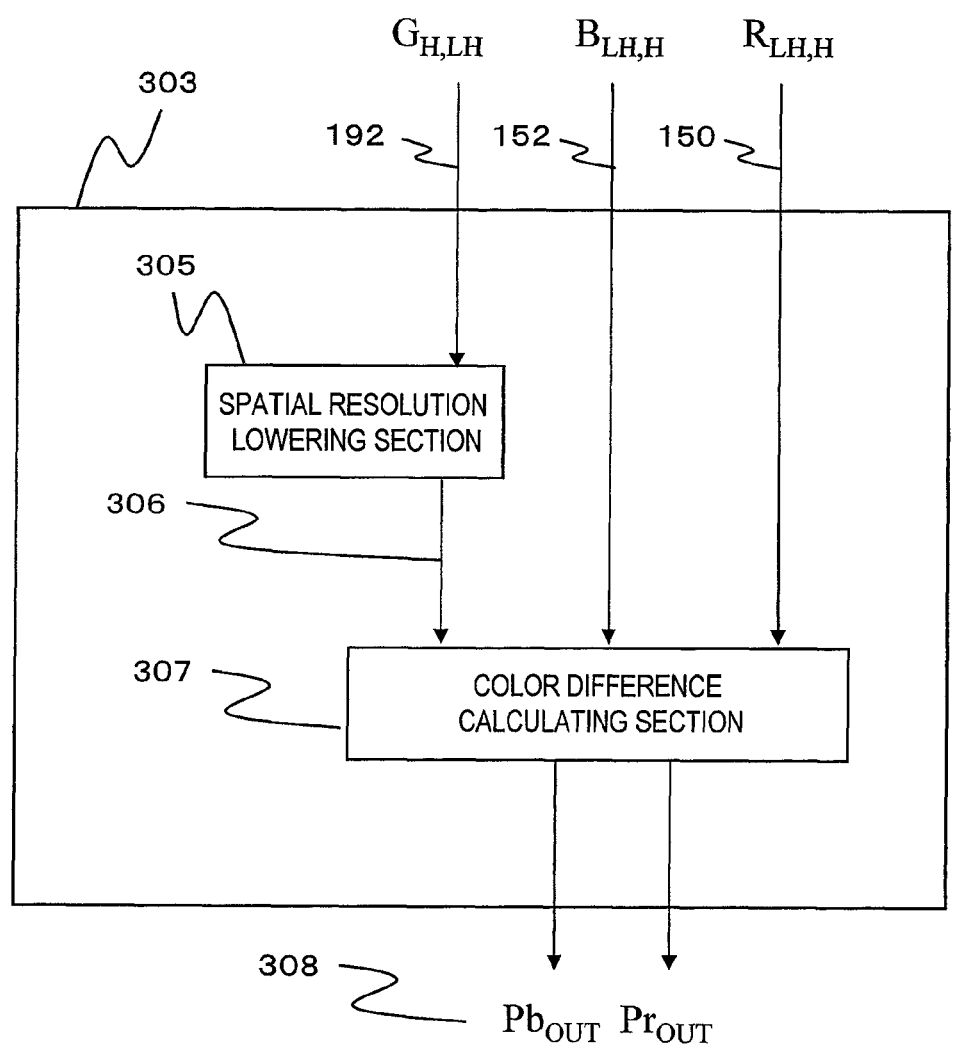
FIG. 15 is a block diagram illustrating a configuration for a color difference converting section 303.

The color difference converting section 303 generates a color difference image based on the R and B images 150 and 152 with low spatial resolution that have been read out by the image shot reading section 111 through the Line B 51 and on the image obtained by lowering the high spatial resolution of the G image 192. FIG. 15 is a block diagram illustrating a configuration for the color difference converting section 303. The spatial resolution lowering section 305 lowers the high spatial resolution of the G image 192 to the level of the R and B imaging sensor sections 105 and 107, thereby generating a G image 306. The spatial frequency distribution of the G image 306 can be handled as the same as that of the R and B images 150 and 152. As a result, the RGB color balance can be maintained. The color difference calculating section 307 calculates a color difference image 308 based on the R, B and G images 150, 152 and 306 by Equation (1).

Figure 16:
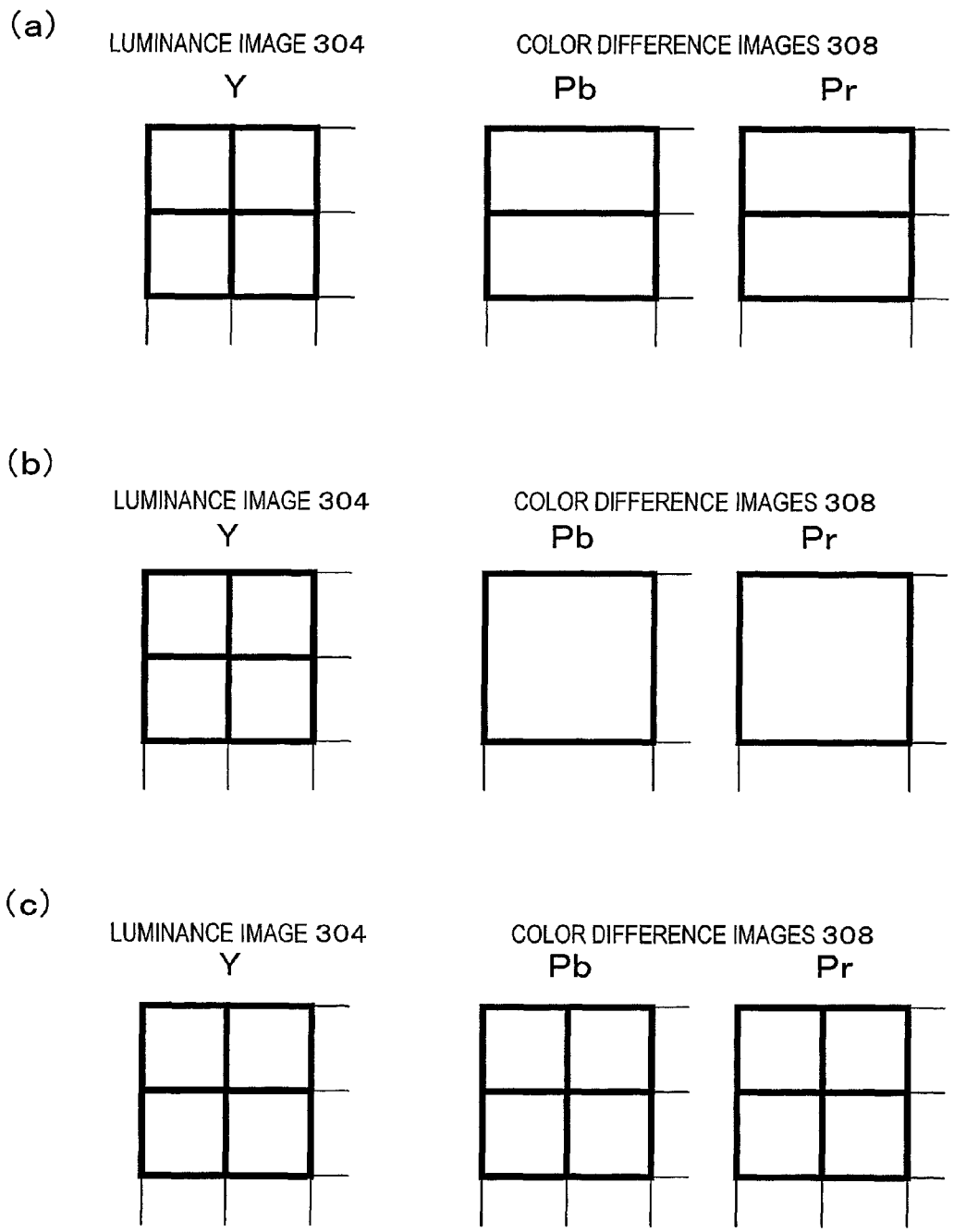
FIGS. 16(*a*) to 16(*c*) illustrate how the image sizes of a luminance image 304 and color difference images 308 may be different.

FIG. 16 illustrates how the image sizes of the luminance image 304 and the color difference images 308 may be different. The luminance image 304 has the same spatial resolution as the G imaging sensor section 106, while the color difference images 308 have the same spatial resolution as the R and B imaging sensor sections 105 and 107. That is why if the number of pixels of the R and B imaging sensor sections 105 and 107 is a half as large as that of the G imaging sensor section 106, the data size of the color difference images 308 that have two color components Pb and Pr becomes equal to that of the luminance image 304 as shown in FIG. 16(a). This format is generally called a "4:2:2 format", which is extensively adopted in current video equipment. Also, this is a format that takes advantage of the property of the human visual system that is less sensitive to color components as already described with reference to FIG. 3. And this is an effective technique for cutting down the data size while maintaining the apparent image quality of a 4:4:4 format with the color components shown in FIG. 16(c) as it is. On the other hand, if the number of pixels and the number of lines of the R and B imaging sensor sections 105 and 107 are both cut down to a half of those of the G imaging sensor section 106 as shown in FIG. 16(b), the data size of the color difference images 308 that have two color components Pb and Pr becomes a half of that of the luminance image 304. This format is generally called a "4:2:0 format", which is extensively adopted in current video equipment. Just like the 4:2:2 format, this 4:2:0 format also takes advantage of the property of the human visual system that is less sensitive to color components. And this is an effective technique for cutting down the data size while maintaining the apparent image quality of a 4:4:4 format with the color components shown in FIG. 16(c) as it is.

The color difference components do not always have to be shared by multiple pixels just as shown in FIG. 16 but any other arbitrary format could also be adopted according to the present invention. For example, a 6:1:1 format in which three pixels are arranged horizontally in each of two vertical lines or two pixels are arranged horizontally in each of three vertical lines could be adopted as shown in FIG. 17(a) or 17(b).

With such a shooting, recording and playback system 300, an image of quality with high spatial resolution and high temporal resolution can be shot, recorded and played using a currently available three-panel camera as it is. In particular, images with high spatial and temporal resolutions can be synthesized together in a luminance/color difference space and an image of quality can be generated with their color balance maintained. Among other things, by making a number of pixels share the same color difference component, luminance/color difference images with high spatial resolution and high temporal resolution can be generated with the data size reduced but with the image maintained.

Embodiment 4

A fourth specific preferred embodiment of the present invention to be described below is a shooting, recording and playback system that shoots and records a first image with high spatial resolution and low temporal resolution in the G wavelength range with the highest luminosity factor and a second image with low spatial resolution and high temporal resolution in the other R and B wavelength ranges, respectively, converts the temporal resolution of the first image into that of the second image in accordance with the correspondence between the low- and high-spatial-resolution images and plays the image with the converted temporal resolution. The system raises the resolution of R and B by superposing high frequency components of G on the components of R and B that have been interpolated and expanded in accordance with the correlation between R and B.

Figure 18:
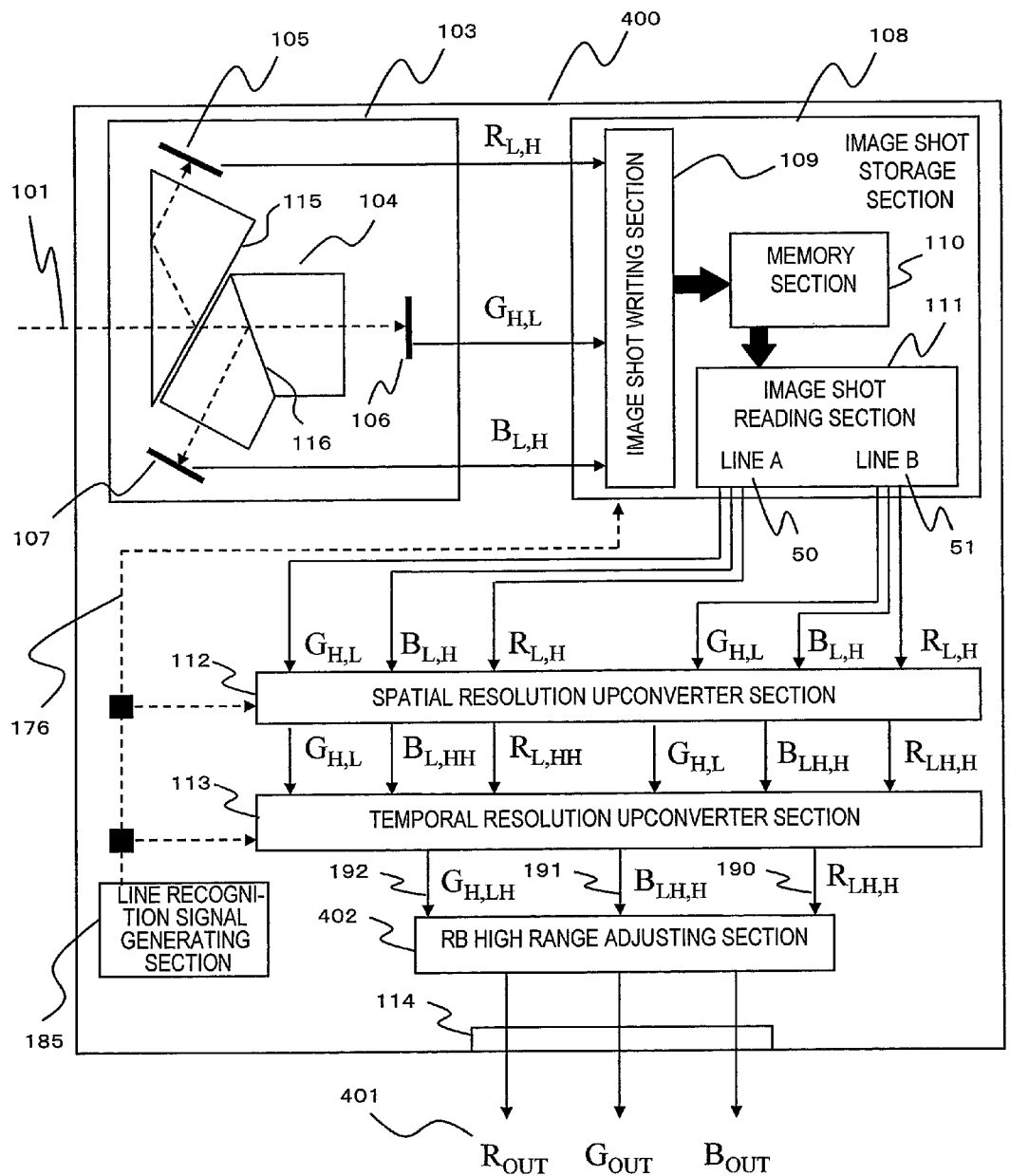
FIG. 18 is a block diagram illustrating a configuration for a shooting, recording and playback system 400 as a fourth specific preferred embodiment of the present invention.

FIG. 18 is a block diagram illustrating a configuration for a shooting, recording and playback system 400 as a fourth specific preferred embodiment of the present invention. In FIG. 18, any component also included in the shooting system 100 shown in FIG. 1 and having substantially the same function as its counterpart will be identified by the same reference numeral and the detailed description thereof will be omitted herein. The shooting system 400 is an apparatus that receives incoming light 101, stores an image shot, and then subjects the image shot to be reproduced to resolution raising processing, thereby outputting RGB images with high spatial resolution and high temporal resolution ($R_{OUT} G_{OUT} B_{OUT}$) 401. The system 400 includes a shooting section 103, a color separating section 104, an R imaging sensor section 105, a G imaging sensor section 106, a B imaging sensor section 107, an image shot storage section 108, an image shot writing section 109, a memory section 110, an image shot reading section 111, a spatial resolution upconverter section 112, a temporal resolution upconverter section 113, an output section 114, a line recognition signal generating section 185, and an RB high range adjusting section 402.

Figure 19:
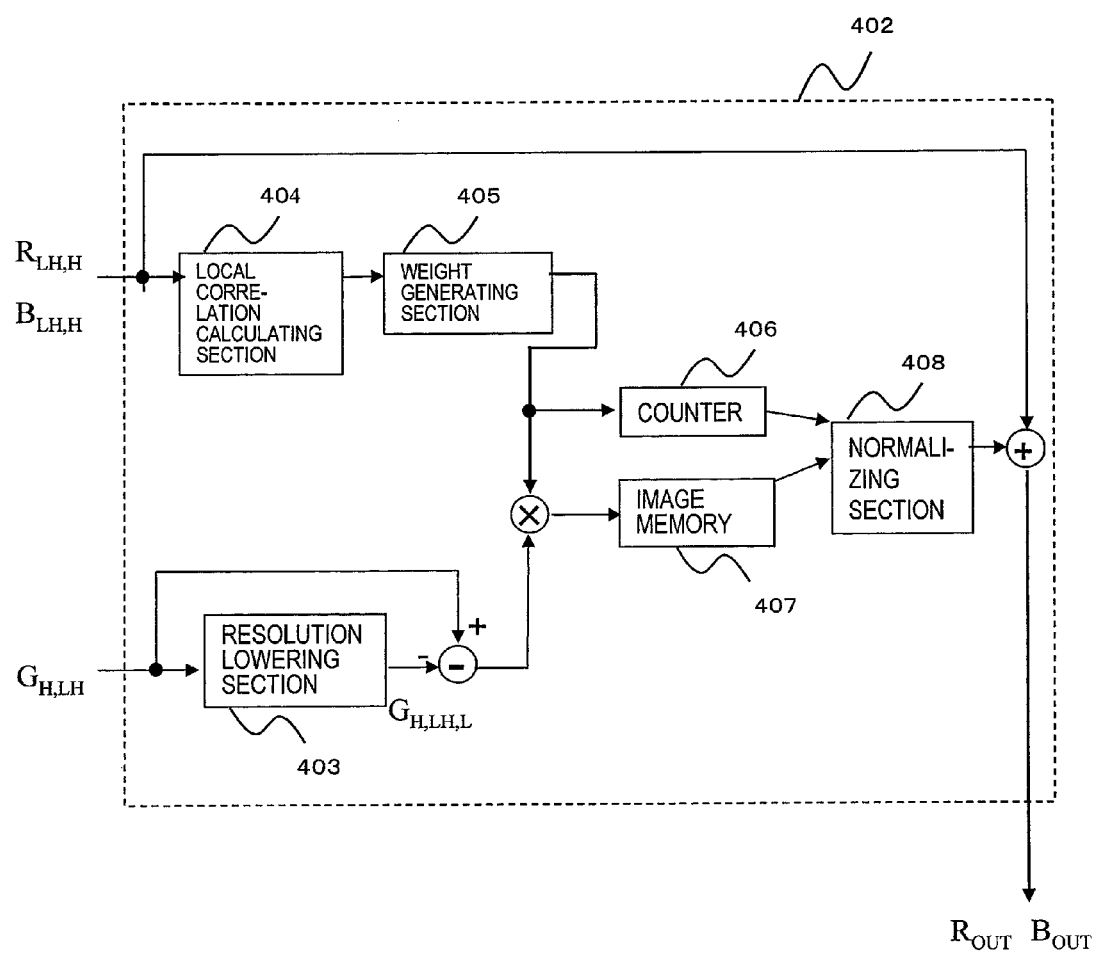
FIG. 19 is a block diagram illustrating a configuration for an RB high range adjusting section 402.

The RB high range adjusting section 402 superposes high frequency components of G on the components of R and B that have been interpolated and expanded in accordance with the correlation between R and B, thereby raising the resolution of R and B. As shown in FIG. 19, the RB high range adjusting section 402 includes a resolution lowering section 403, a local correlation calculating section 404, a weight generating section 405, a counter 406, an image memory 407 and a weight normalizing section 408.

The RB high range adjusting section 402 performs its processing on a frame-by-frame basis. First of all, when each frame starts to be processed, the contents of the counter 406 and the image memory 407 are reset to zero.

The resolution lowering section 403 lowers the spatial resolution of the G component $G_{H,LH}$ that has been raised by the temporal resolution upconverter section 113, thereby outputting $G_{H,LH,L}$.

$R_{LH,H}$ and $B_{LH,H}$ denote R and B images that have been interpolated and expanded by the spatial resolution upconverter section 112 and have the same number of pixels and the same number of lines as $G_{H,LH}$ that has been generated by the temporal resolution upconverter section 113.

Figures 20, 21:
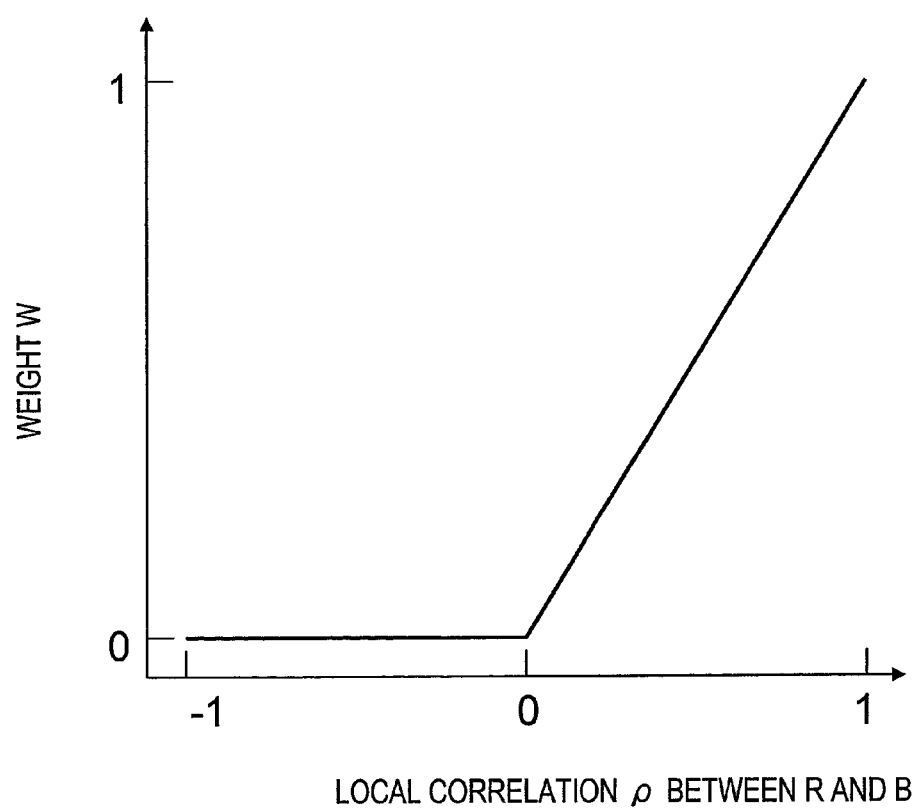
FIG. 20 illustrates examples of local areas.
FIG. 21 illustrates how the local correlation p between R and B changes with the weight W.

In a local area that may consist of 2×2 pixels as shown in FIG. 20, for example, the local correlation calculating section 404 calculates the degree of correlation between $R_{LH,H}$ and $B_{LH,H}$ by the following Equation (3):

$$\rho = \frac{\sum_{i=1}^{4}(R_i - \overline{R})(B_i - \overline{B})}{\sqrt{\sum_{i=1}^{4}(R_i - \overline{R})}\sqrt{\sum_{i=1}^{4}(B_i - \overline{B})}} \quad (3)$$

It should be noted that the local correlation between R and B does not always have to be calculated in such an area consisting of 2×2 pixels. Alternatively, the local correlation could also be calculated in a broader rectangular area consisting of 3×3 pixels, 4×4 pixels, or 5×5 pixels, for example, or in a circular, quadrangular, or polygonal area. Still alternatively, the local correlation could also be calculated with a weight added to a pixel location of interest and its surrounding area using a Gaussian function, for example.

The weight generating section 405 generates a weight based on the correlation value that has been calculated by the local correlation calculating section 404. The correlation value and the weight may have the relation shown in FIG. 21, for example. That is to say, the greater the positive correlation, the heavier the weight W should be to widen the difference between $G_{HH}$ and $G_{LH}$ (i.e., the high range components of G) to be superposed. On the other hand, if there is negative correlation, the difference between $G_{HH}$ and $G_{LH}$ (i.e., the high range components of G) is not superposed and the weight W is supposed to be zero. Each difference between $G_{HH}$ and $G_{LH}$ (i.e., the high range components of G) multiplied by the weight W is added to its address representing a pixel location in the image memory 407. In this case, the writing range in the image memory 407 may be either one pixel or a range in which the local correlation value has been calculated. If the high range components are superposed with respect to multiple pixels as in the latter case, the high range waveform could be superposed on the same pixel a number of times depending on how to define the range to calculate the local correlation (i.e., how to make an increment in the pixel). That is why in this case, the counter 406 counts and stores the number of times the high range waveform has been superposed for each pixel with that possibility in mind.

The normalizing section 408 divides the high range waveform that has been superposed multiple times by the number of times of write that is stored on a pixel-by-pixel basis in the counter 406. The high range signal thus normalized is superposed on $R_{LH,H}$ and $B_{LH,H}$ and output as $R_{OUT}$, $B_{OUT}$.

With such a shooting, recording and playback system 400, an image of quality with high spatial resolution and high temporal resolution can be shot, recorded and played using a currently available three-panel camera as it is. In particular, the resolution of R and B can be raised with a local color balance maintained. As a result, the resolution can be increased with the production of false colors minimized.

Embodiment 5

A fifth specific preferred embodiment of the present invention to be described below is a shooting, recording and playback system that shoots and records a first image with high spatial resolution and low temporal resolution in the G wavelength range with the highest luminosity factor and a second image with low spatial resolution and high temporal resolution in the other R and B wavelength ranges, respectively, converts the temporal resolution of the first image into that of the second image in accordance with the correspondence between the low- and high-spatial-resolution images and plays the image with the converted temporal resolution. The system can generate and store a database, which needs to be used to convert the temporal resolution of the first image into that of the second image, while shooting images.

Figure 22:
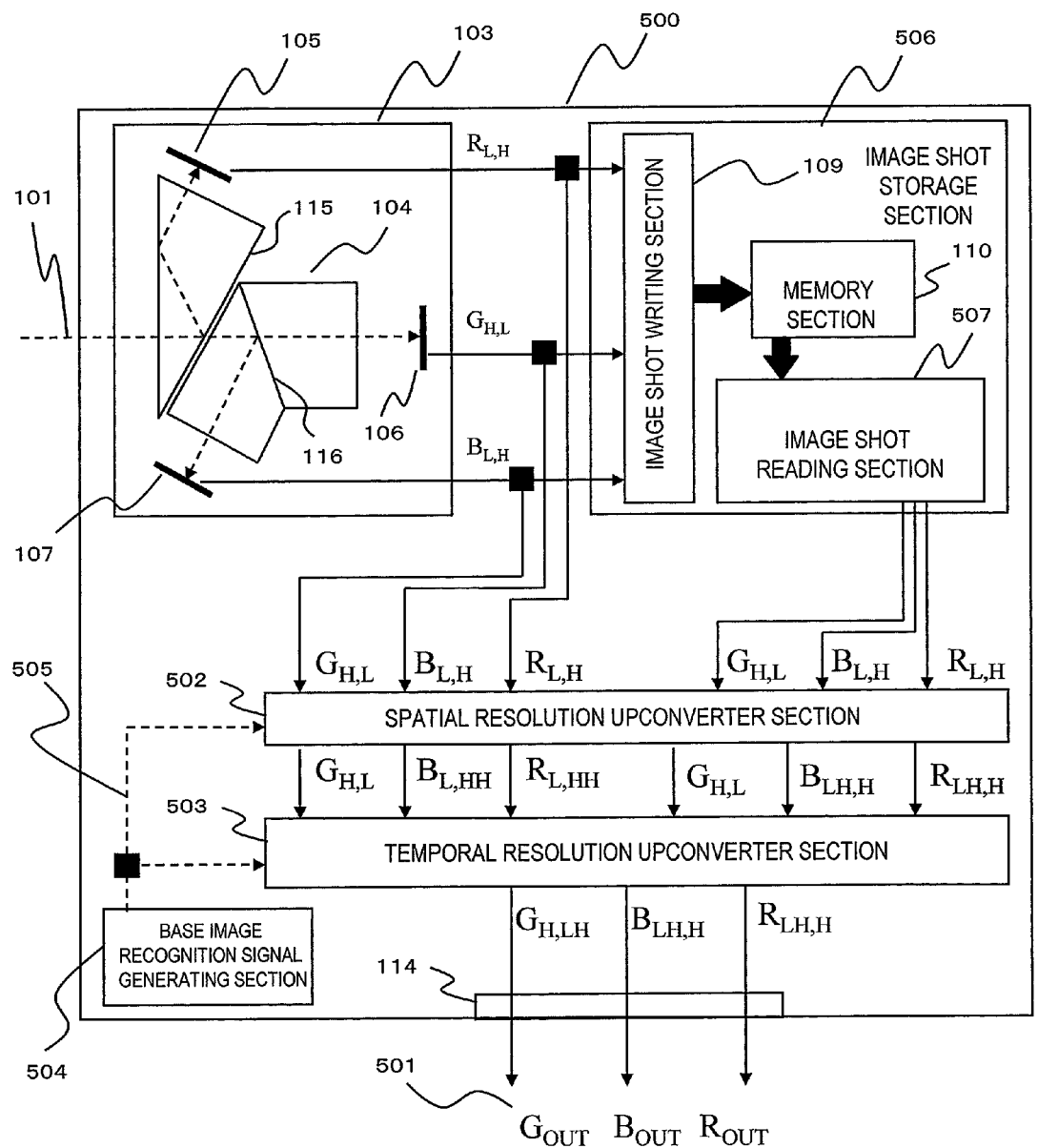
FIG. 22 is a block diagram illustrating a configuration for a shooting, recording and playback system 500 as a fifth specific preferred embodiment of the present invention.

FIG. 22 is a block diagram illustrating a configuration for a shooting, recording and playback system 500 as a fifth specific preferred embodiment of the present invention. In FIG. 22, any component also included in the shooting system 100 shown in FIG. 1 and having substantially the same function as its counterpart will be identified by the same reference numeral and the detailed description thereof will be omitted herein. The shooting system 500 is an apparatus that receives incoming light 101, stores an image shot, and then subjects the image shot to be reproduced to resolution raising processing, thereby outputting RGB images with high spatial resolution and high temporal resolution ($R_{OUT}$, $G_{OUT}$, $B_{OUT}$) 501. The system 500 includes a shooting section 103, a color separating section 104, an R imaging sensor section 105, a G imaging sensor section 106, a B imaging sensor section 107, an image shot storage section 506, an image shot writing section 109, a memory section 110, an image shot reading section 507, a spatial resolution upconverter section 502, a temporal resolution upconverter section 503, an output section 114, and a base image recognition signal generating section 504.

The spatial resolution upconverter section 502 decides the timing to get the base image set 130 (which corresponds to the time t1 or t15 shown in FIG. 2A) by the base image recognition signal 505 that has been generated by the base image recognition signal generating section 504 and interpolates and expands only the R and B images 131 and 133 that are included in the base image set 130, thereby generating R and B images 134 and 135.

The temporal resolution upconverter section 502 decides the timing to receive the R, B and G images 134, 135 and 132 from the spatial resolution upconverter section 502 (which corresponds to the time t1 or t15 shown in FIG. 2A) by the base image recognition signal 505 that has been generated by the base image recognition signal generating section 504, generates image feature vector R, B and G images 136, 137 and 139 and stores them in the G image generating database section 140 (see FIG. 10).

The image shot reading section 507 of the image shot storage section 506 reads the image shot to be reproduced from the memory section 110 and enters it into the spatial resolution upconverter section 502.

With such a shooting, recording and playback system 500, an image of quality with high spatial resolution and high temporal resolution can be shot, recorded and played using a currently available three-panel camera as it is. In particular, the data to get stored in the G image generating database section 140 of the temporal resolution upconverter section 503 can be generated and stored while images are being shot. As the G image generating database section 140, any type of storage medium such as a hard disk that uses a magnetic material or a semiconductor memory may be used. If the storage medium is removable from the shooting, recording and playback system 500, then the data stored in the G image generating database section 140 can be moved or copied to another device.

Embodiment 6

A sixth specific preferred embodiment of the present invention to be described below is a shooting, recording and playback system that shoots and records a first image with high spatial resolution and low temporal resolution in the G wavelength range with the highest luminosity factor and a second image with low spatial resolution and high temporal resolution in the other R and B wavelength ranges, respectively, converts the temporal resolution of the first image into that of the second image in accordance with the correspondence between the low- and high-spatial-resolution images and plays the image with the converted temporal resolution. Once an image blur has occurred, no image with high spatial resolution can be shot anymore, and therefore, the database for converting the temporal resolution of the first image into that of the second image may stop being generated or stored.

Figure 23:
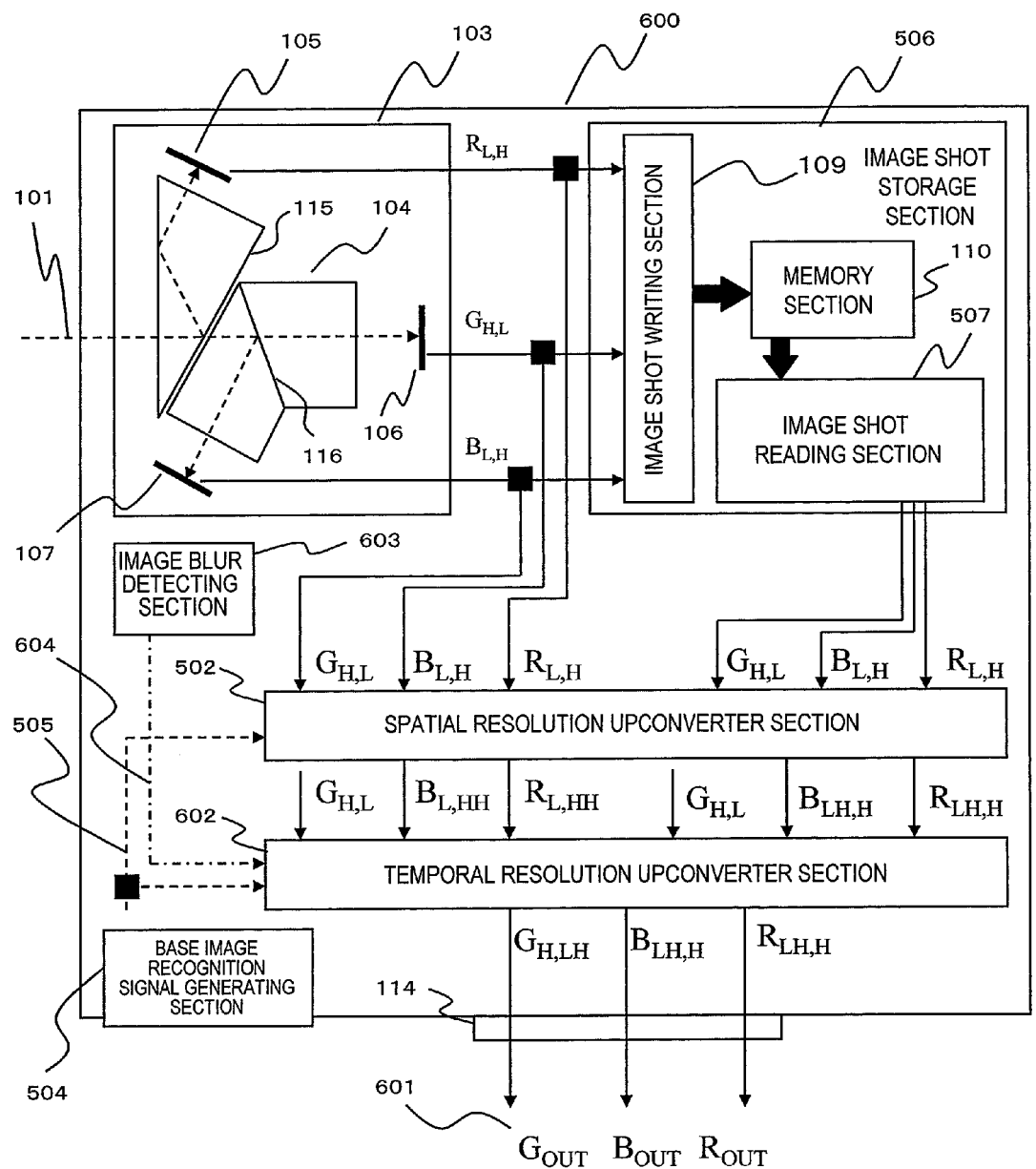
FIG. 23 is a block diagram illustrating a configuration for a shooting, recording and playback system 600 as a sixth specific preferred embodiment of the present invention.

FIG. 23 is a block diagram illustrating a configuration for a shooting, recording and playback system 600 as a sixth specific preferred embodiment of the present invention. In FIG. 23, any component also included in the shooting system 500 shown in FIG. 22 and having substantially the same function as its counterpart will be identified by the same reference numeral and the detailed description thereof will be omitted herein. The shooting system 600 is an apparatus that receives incoming light 101, stores an image shot, and then subjects the image shot to be reproduced to resolution raising processing, thereby outputting RGB images with high spatial resolution and high temporal resolution ($R_{OUT} G_{OUT} B_{OUT}$) 601. The system 600 includes a shooting section 103, a color separating section 104, an R imaging sensor section 105, a G imaging sensor section 106, a B imaging sensor section 107, an image shot storage section 506, an image shot writing section 109, a memory section 110, an image shot reading section 507, a spatial resolution upconverter section 502, a temporal resolution upconverter section 602, an output section 114, a base image recognition signal generating section 504 and an image blur detecting section 603.

The image blur detecting section 603 detects a blur in an image shot and outputs an image blur generation signal 604 to the temporal resolution upconverter section 602 to notify the section 602 of that. The image shot will get blurred if the relative position of the subject to the shooting, recording and playback system 600 changes while the incoming light 101 is entering the R, G or B imaging sensor 105, 106 or 107. As used herein, the change of the relative position of the subject to the shooting, recording and playback system 600 occurs if either the subject or the shooting, recording and playback system 600 has moved. The longer the shutter of the R, G or B imaging sensor 105, 106 or 107 is opened, the more likely such an image blur will occur due to a change in the relative position of the subject to the shooting, recording and playback system 600. And if there is an insufficient amount of light to irradiate the subject (e.g., inside a room or in the twilight), the image blue is more likely to occur. That is why if the shutter speed is compared to a predetermined threshold value, the image blur can be detected. Also, the blur of an image shot is a so-called "focus error" that happens if the focal length has not been set perfectly properly. And such an image blur will occur if the focal length of a lens system to produce a subject's image on the R, G or B imaging sensor 105, 106 or 107 is inappropriate. For that reason, it can be determined that the image blur be occurring while an autofocusing mechanism is working.

On being notified, by receiving the image blur generation signal 604, that an image blur is occurring, the temporal resolution upconverter section 602 stops adding data to the G image generating database section 140 (see FIG. 10). The G image 132 being shot while an image blur is occurring has no high frequency components, and therefore, cannot be used to raise the spatial resolution. That is why no data should be added to the G image generating database section 140 anymore.

It should be noted that according to the present invention, any arbitrary technique could be adopted to detect such an image blur.

Generally speaking, if the shutter speed has decreased, a flash is turned ON to eliminate the image blur. With the flash ON, if a high shutter speed is ensured, high frequency components can be captured. Thus, a high-spatial-resolution image that has been shot while the flash is ON is added to the G image generating database section 140.

With such a shooting, recording and playback system 600, an image of quality with high spatial resolution and high temporal resolution can be shot, recorded and played using a currently available three-panel camera as it is. In particular, once an image blur has occurred, no image with high spatial resolution can be shot anymore, and therefore, the database for converting the temporal resolution of the first image into that of the second image may stop being generated or stored. As a result, it is possible to prevent data that would be rarely used again from being added to the database for nothing.

It should be noted that the respective components of the preferred embodiments of the present invention described above could be implemented as hardware components or with a software program. For example, at least a part of the image data generating processing could be implemented as a computer-readable program or carried out by some components of a computer itself. Also, the shooting section 103 and the image shot writing section 109 could be omitted from any of the systems described above. In that case, the image data that has been captured with a different camera is entered and subjected to the image processing described above.

INDUSTRIAL APPLICABILITY

As can be seen from the foregoing description, the present invention is applicable effectively to any type of video device such as a video movie camera, a TV set, or a digital still camera with a moving picture shooting function. The present invention can be used in widely popular personal computers, too.

The invention claimed is:

1. An apparatus for generating image data, the apparatus comprising:
    a light splitting section for splitting incoming light that has come from a subject according to its wavelength ranges;
    a first image capturing section, which receives a portion of the split light that falls within a wavelength range with the highest luminosity factor, thereby getting a first image;
    a second image capturing section, which receives the rest of the light that falls within the remaining wavelength ranges, other than the one with the highest luminosity factor, thereby getting a second image that has a lower spatial resolution, and a higher temporal resolution, than the first image; and
    a resolution converting section for converting the temporal resolution of the first image into that of the second image using the first and second images, and
    wherein the resolution converting section converts the spatial resolution of the second image into that of the first image, wherein the resolution converting section includes a database section that stores the first image and the second image converted, and wherein the resolution converting section uses the first image and the second image converted that have been retrieved from the database section to convert the temporal resolution of the first image into that of the second image, and further comprising an image blur detecting section for detecting an image blur, wherein if the image blur detecting section has detected an image blur, the database section stops storing the first image and the second image converted.

\* \* \* \* \*